United States Patent
Ogasawara et al.

(10) Patent No.: US 7,143,402 B2
(45) Date of Patent: Nov. 28, 2006

(54) METHOD AND APPARATUS FOR PRECISION OPTIMIZATION IN COMPILED PROGRAMS

(75) Inventors: Takeshi Ogasawara, Hachioji (JP); Toshio Suganuma, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 10/621,281

(22) Filed: Jul. 16, 2003

(65) Prior Publication Data

US 2004/0093319 A1    May 13, 2004

(30) Foreign Application Priority Data

Jul. 31, 2002    (JP) .............................. 2002-224207

(51) Int. Cl.
*G06F 9/45*    (2006.01)
(52) U.S. Cl. ..................................... 717/151
(58) Field of Classification Search ................. 717/151
See application file for complete search history.

(56) References Cited

U.S. PATENT DOCUMENTS 5,587,897 A  *  12/1996  Iida .............................. 700/28

OTHER PUBLICATIONS

Michael Paleczny, Christopher Vick and Cliff Click, "The Java® HotSpot Server Compiler", The USENIX Association: Proceedings of the Java® Virtual Machine Research and Technology Symposium (JVM '01).

\* cited by examiner

*Primary Examiner*—John Chavis
(74) *Attorney, Agent, or Firm*—Rafael Perez, Esq.

(57) ABSTRACT

A compiler mounted on a computer generates a first object code of a target method in a double precision mode in the floating-point computation. If the target method is found to be frequently called in a single precision mode and a runtime cost may be reduced by executing the target method in the single precision mode, a second object code of the target method is generated in the single precision mode. Alternatively, regardless of whether a target method to be compiled will be called by the double precision mode or the single precision mode in the floating-point computation, the object code is generated by setting the precision mode depending on the type of the computation within the target method. Then, a code for matching the precision mode is generated and added based on a relation between the target code and its caller method.

26 Claims, 18 Drawing Sheets

| KIND OF OPERATION | RESTRICTION ON INPUT 1 | RESTRICTION ON INPUT 2 | ... |
|---|---|---|---|
| DMUL | MANTISSA IS SINGLE PRECISION | MANTISSA IS 1 | |
| DSQRT+D2F | MANTISSA IS SINGLE PRECISION | N/A | |
| ⋮ | | | |

(A)

```
if (cond) (
    statement11
    statement12
) else (
    statement21
    statement22
)
    statement3
```

(B)

```
Basic Block 1
    test cond
    if true go to Basic Block 2
    go to Basic Block 3

Basic Block 2
    statement11
    statement12
    go to Basic Block 4

Basic Block 3
    statement21
    statement22
    go to Basic Block 4

Basic Block 4
    statement3
```

| R NUMBER | START POSITION | END POSITION | BASIC BLOCKS INCLUDED IN THE REGION | ATTRIBUTE |
|---|---|---|---|---|
| 1 | THE THIRD INSTRUCTION IN BASIC BLOCK 1 | THE SECOND INSTRUCTION IN BASIC BLOCK 3 | 1, 2, 3 | SINGLE PRECISION |
| 2 | ... | ... | ... | ... |
| ... | | | | |

2001

METHOD AND APPARATUS FOR PRECISION OPTIMIZATION IN COMPILED PROGRAMS

PRIORITY

This application claims priority to an application entitled "A PROGRAM CONVERSION METHOD, DATA PROCESSING APPARATUS AND PROGRAM USING THE METHOD" filed in the Japan Patent Office on Jul. 31, 2002 and assigned Serial No. 2002-224207, the contents of which are hereby incorporated by reference.

BACKGROUND OF THE INVENTION

1. Field of the Invention

The present invention generally relates to a technique for rapid program compilation, and more particularly to a method for providing accurate floating-point computation.

2. Description of the Related Art

In a floating-point computation in Java® (a registered trademark of Sun Microsystems Incorporated), precisions for a single precision computation and a double precision computation are defined by a language specification (24 bits mantissa and 8 bits exponent for the single precision computation, and 53 bits mantissa and 11 bits exponent for the double precision computation, respectively).

With CPUs of IA32 (Intel Architecture-32) architecture (the x86 family of Intel Corporation and compatible CPUs), it has been required to take either of the following approaches in order to execute both single precision computations and double precision computations:

(Approach 1) switching the CPU's floating-point computation mode by setting the floating-point control word (hereinafter, referred to as FCW); or (Approach 2) executing the computation in the double precision mode, and if a computation result is to be obtained in single precision, storing the value on a floating-point register into a memory in single precision and reading it to degrade the computation precision.

A method executing the single precision computation is considered by way of example. Generally, this method may be called in the double precision computation CPU mode (hereinafter, referred to as a double precision mode) or in the single precision computation CPU mode (hereinafter, referred to as a single precision mode). If the method is called in the single precision mode, it is more efficient to execute the code assuming the single precision mode. If the method is called in the double precision mode, it is necessary to prevent loss of computation precision according to Approach 1 or Approach 2 described above. One means of improving efficiency is to analyze the program to compare execution costs for the case using Approach 1 and for the case using Approach 2, and to execute the faster Approach, i.e. the one with less overhead (this analysis is hereinafter referred to as an inter-method analysis).

In a separate compilation environment for compiling a method having a high execution frequency, as in a dynamic compiler such as a JIT (Just In Time) compiler for Java®, it is not known whether the method being compiled will be called in the single precision mode or in the double precision mode. Therefore, for example, the precision mode is fixed as double precision at method boundaries (that is, all methods are called in the double precision mode), and if the single precision computation is executed, a code is generated according to the above described cost calculation.

A technique for the above described cost calculation and code generation is described in the following prior art document, incorporated here by reference:

M. Paleczny, C. Vick, and C. Click. The Java® HotSpot Server Compiler. The USENIX Association: Proceedings of the Java® Virtual Machine Research and Technology Symposium (JVM '01).

The above described prior art has a disadvantage in that the execution cost is high in either Approach 1 or Approach 2 and large overhead is incurred.

Specifically, in the case of Approach 1, a switch instruction for the FCW, with a form of, for example, (fldcw word ptr [mem]), is a high cost instruction. In addition, once the FCW is switched, it is necessary to switch the FCW again before and after a method call in that range and return the mode to the double precision mode as a standard, which may cause further overhead.

In the case of Approach 2, instructions for writing into and reading from a memory are executed whenever the single precision computation is executed; memory access may cause overhead and degrade overall execution performance.

In addition, in the dynamic compilation environment, an inter-method analysis may, for example, have excessive compilation time overhead, and so may not be effective for choosing a calculation Approach. Moreover, since new classes can be loaded dynamically, an analysis result may become invalid later, thus wasting computation resources.

Therefore, it is an object of the present invention to provide an efficient mechanism for preventing loss of precision for both a single precision computation and a double precision computation in a floating-point computation, while avoiding execution overhead and invalidation of the analysis result.

SUMMARY OF THE INVENTION

In order to achieve the above described object, a first embodiment of the present invention is realized as a program conversion method, as described below, for generating a specialized machine language code by controlling a computer to compile a program. The program conversion method includes the following steps: a first step of, when a method constituting the program is executed, storing information into a memory regarding whether the method is called in a double precision mode or a single precision mode in a floating-point computation; a second step of, if a default precision mode is selected to be either the double precision mode or the single precision mode in the floating-point computation in the program, when a target method is being compiled, examining a frequency with which the target method is called in a non-default precision mode, based on the information stored in the memory; and a third step of generating and storing in the memory a specialized machine language code corresponding to the call to the target method in the non-default precision mode, based on the information on the frequency with which the target method is called in the non-default precision mode.

The frequency with which the method is called in the non-default precision mode may be determined, for example, by counting how many times the method is called in the non-default precision mode in a runtime of the program, and by comparing the counter value with a predetermined threshold value. It is preferable to generate the specialized machine language code only when the execution cost can be reduced by running the target method in the non-default precision mode.

In a system in which it is standard to perform method calls in the double precision mode, such as Java®, the single precision mode is the non-default precision mode.

The number of target methods for which the specialized machine language code is generated can be increased when the specialized machine language code is generated, as a preprocess, by detecting a portion of the target method to be compiled in which the computation is executed in an excessive precision, and by replacing the portion of the target method with a single precision computation. Alternatively, it may be possible to generate better code with more efficient control of the precision mode if the preprocess includes executing a program analysis with respect to the target method being compiled, and dividing the method into regions for single precision computations and regions for double precision computations.

Another embodiment of the program conversion method according to the present invention includes the following steps: a first step of, with respect to a target method to be compiled, setting a computation precision mode depending on a floating-point precision mode in a caller method that calls the target method, and generating and storing a machine language code in a memory; a second step of examining a relation between the target method and the caller method; and a third step of generating an auxiliary machine language code depending on the result of the examination and adding the auxiliary machine language code to the machine language code stored in the memory.

More particularly, the second step examines whether the caller method is in a double precision mode or in a single precision mode, and the third step generates and adds the auxiliary code for matching the precision mode, if the precision mode in the caller method is different from the precision mode in the target method.

The number of target methods for which the specialized machine language code is generated can be increased if the specialized machine language code is generated, as a preprocess, by detecting a portion of the target method to be compiled in which the computation is executed in an excessive precision, and by replacing the portion of the target method with a single precision computation. Alternatively, it may be possible to generate better code for each portion of the program, on a finer level of code fragment than the method level, if the preprocess includes executing a program analysis with respect to the target method being compiled, and dividing the method into regions for single precision computations and regions for double precision computations.

The present invention for achieving the above described objectives can also be realized as a data processing apparatus configured as follows. The data processing apparatus is provided with a compiler for compiling a program on a method by method basis, and a program execution unit for executing the program in an interpreter and in a code compiled in the compiler. The compiler generates a first version of code for the target method in a default precision mode which may be either the double precision mode or the single precision mode in a floating-point computation. If the target method satisfies a certain condition, the compiler generates a second version of code for the target method in the non-default precision mode.

The present invention can also be realized as a data processing apparatus provided with: code generation means for, with respect to a target method to be compiled, setting a computation precision depending on a precision mode in a floating-point computation in a caller method that calls the target method, and generating a machine language code; and means for adding auxiliary code, based on a relation between the precision mode in the target method and the precision mode in the caller method, for matching the precision mode, and for adding the auxiliary code to the machine language code generated by the code generation means.

The present invention is also realized as a program for controlling and causing a computer to execute a process corresponding to each step in the above described program conversion method, or as a program for operating the computer as the data processing apparatus described above. Either of these programs may be provided by storage in and distribution of a magnetic disk, an optical disk, a semiconductor memory, or other storage media, or by delivery via a network.

BRIEF DESCRIPTION OF THE DRAWINGS

FIGS. 19(A) and 19(B) show an example of a source program and its corresponding basic blocks; and FIG. 20 shows an example of a management table used in the fourth embodiment.

DETAILED DESCRIPTION OF THE PREFERRED EMBODIMENTS

The invention proposes the following two approaches to prevent loss of precision in a floating-point computation in a code generated by compilation and to reduce overhead such as switching a precision mode setting in a FCW (floating-point control word) or storing to and reloading from a memory. A first embodiment is proposed in which a code generation is executed with either single precision mode or double precision mode as a default precision mode, the program is executed, and a specialized code corresponding to a non-default precision mode is generated for those methods which are frequently called in the non-default precision mode. A second embodiment is proposed in which, according to the precision mode of a caller method which calls a target method to be compiled, code generation is executed so as to optimize the target method.

To realize the above described two approaches more effectively, as a preprocess of these code generations, the present invention also proposes a third embodiment for replacing computations in the method and a fourth embodiment for analyzing codes in the method.

Application of the present invention to a JIT compiler for Java® will be described by way of example in the following embodiments. That is, the double precision mode is the default precision mode at method boundaries, and the program conversion method is executed if the method can be called in the single precision mode.

1. First Embodiment

In the first embodiment, in the case where a target method is compiled once the program is actually run, if the single precision mode is selected as the default for the target method, and the target method is called frequently enough from other methods where the single precision mode is selected as default, the program conversion method is executed for the target method. An efficient code can thus be generated without switching the FCW mode or having to execute memory write and read instructions to prevent loss of precision.

Figure 1:
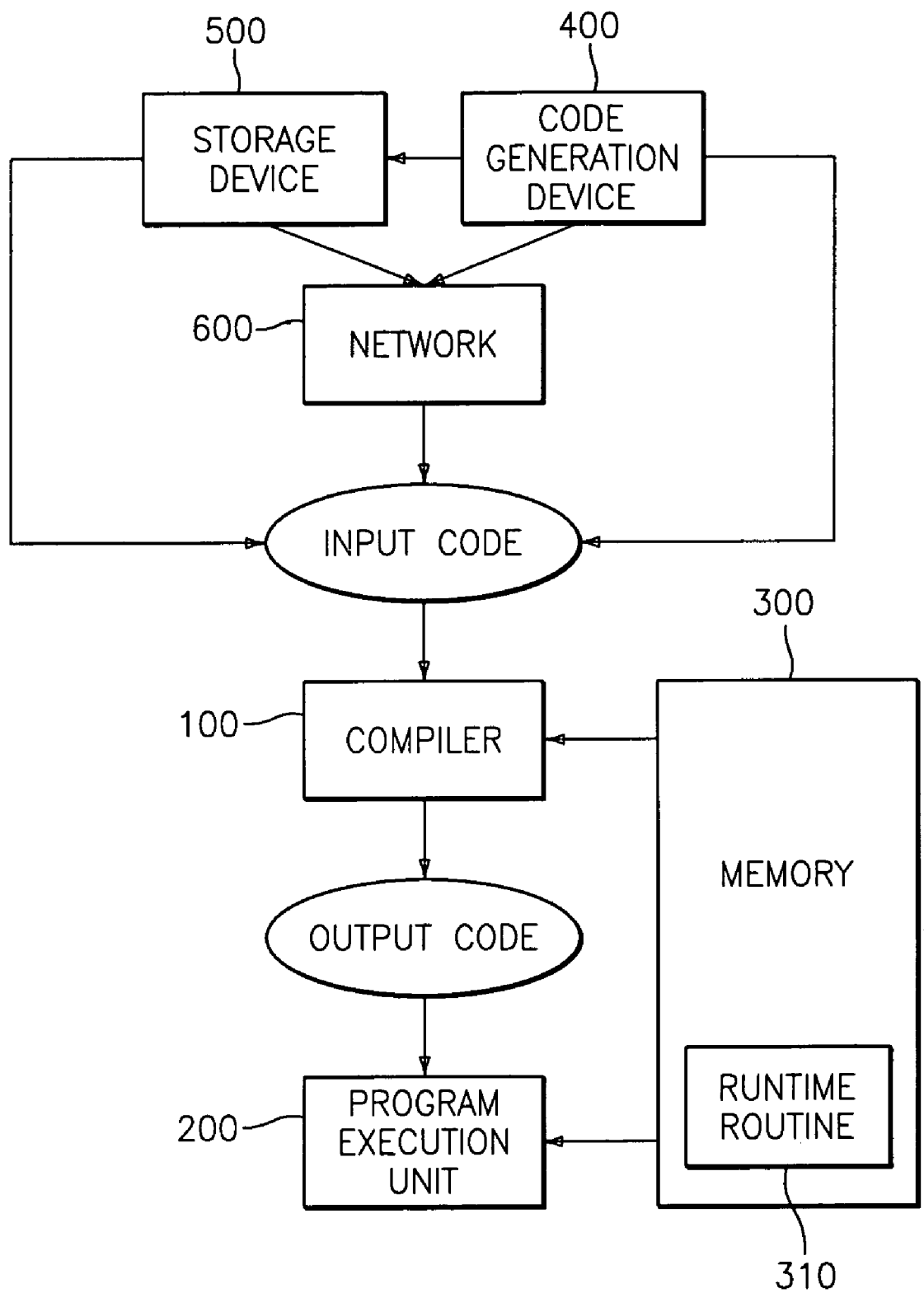
FIG. 1 illustrates a configuration of a computer system for realizing a method for preventing loss of precision in a floating-point computation according to a first embodiment of the present invention.

FIG. 1 illustrates a configuration of a computer system for realizing the floating-point computation with no loss of precision according to the first embodiment.

Referring to FIG. 1, the computer system in this embodiment is provided with a compiler 100 for compiling a source program (an input code), a program execution unit 200 for executing an object program (an output code) compiled by the compiler 100 to perform various processes, and a memory 300. The compiler 100 and the program execution unit 200 are realized in a CPU programmably controlled in the computer system, where the computer system may be, for example, a personal computer or a workstation. The memory 300 is a main memory in the computer, and is realized with, for example, a RAM. The memory 300 stores a program for controlling the CPU to execute the compiler 100, a program to be compiled (hereinafter, referred to as an executable program), and a runtime routine 310 to be used for execution of the executable program. The program stored in the memory 300 may be saved in a magnetic disk or other external storage device as necessary.

In FIG. 1, the compiler 100 takes the input code written in a byte code to process it, and generates and outputs the output code in a machine language. This input code is generated by a code generation device 400, or comes from a storage device 500 which stores the input code generated by the code generation device 400, or from the code generation device 400 or the storage device 500 residing on a network 600, via the network 600. The output code generated by the compiler 100 is executed by the program execution unit 200. The program execution unit 200 executes not only an object code (a machine language code) of the executable program compiled by the compiler 100, but also executes the executable program with an interpreter. When the executable program is executed, the program execution unit 200 collects its execution profile and stores it in the memory 300.

An operation according to this embodiment will be described below in detail with reference to FIGS. 2 to 5. The operation is realized in the runtime routine 310 stored in the memory 300.

Figure 2:
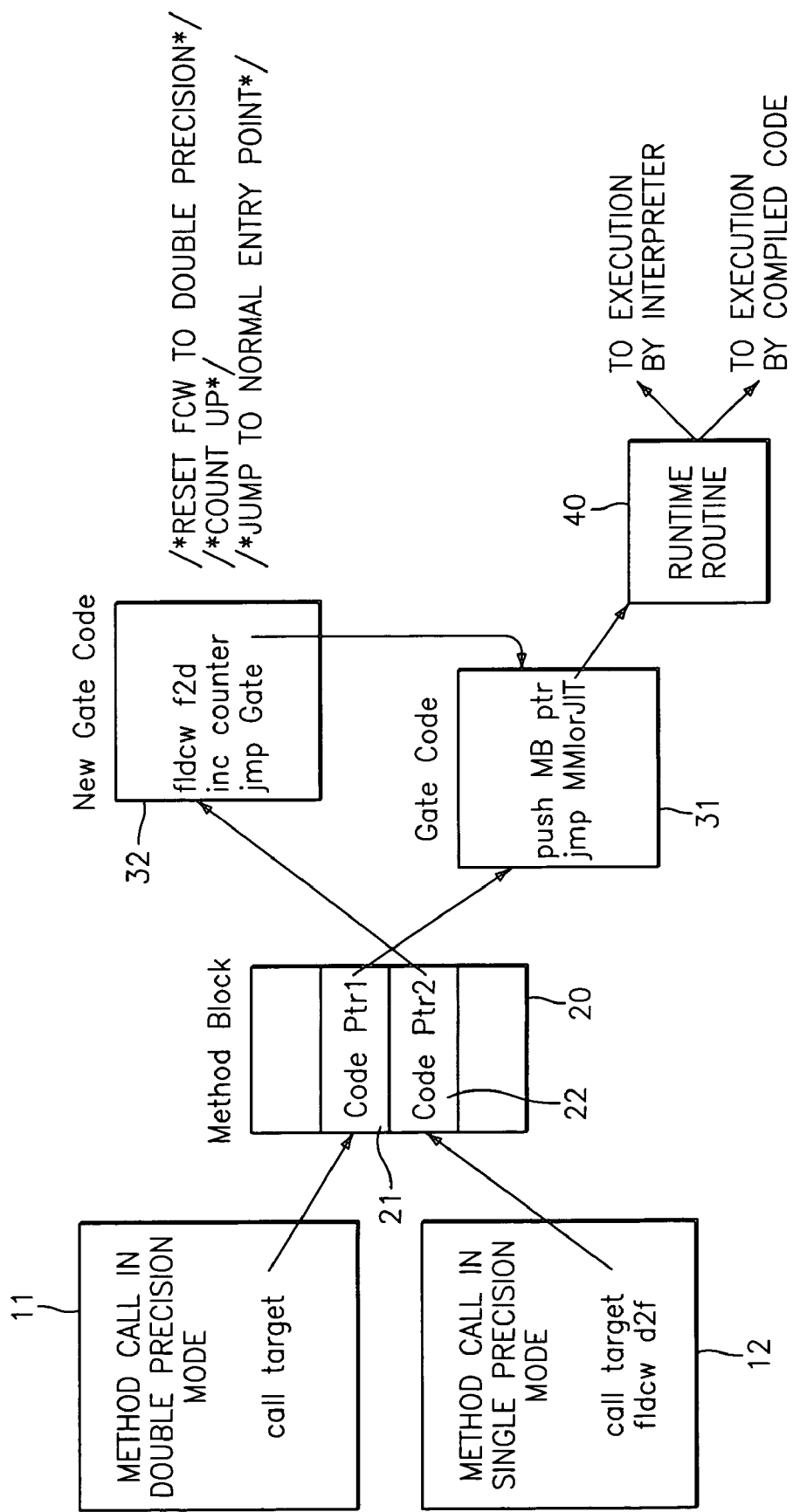
FIG. 2 shows a data structure generated by a runtime routine for realizing the operation according to the first embodiment, showing the data structure in an initial state.
Figure 3:
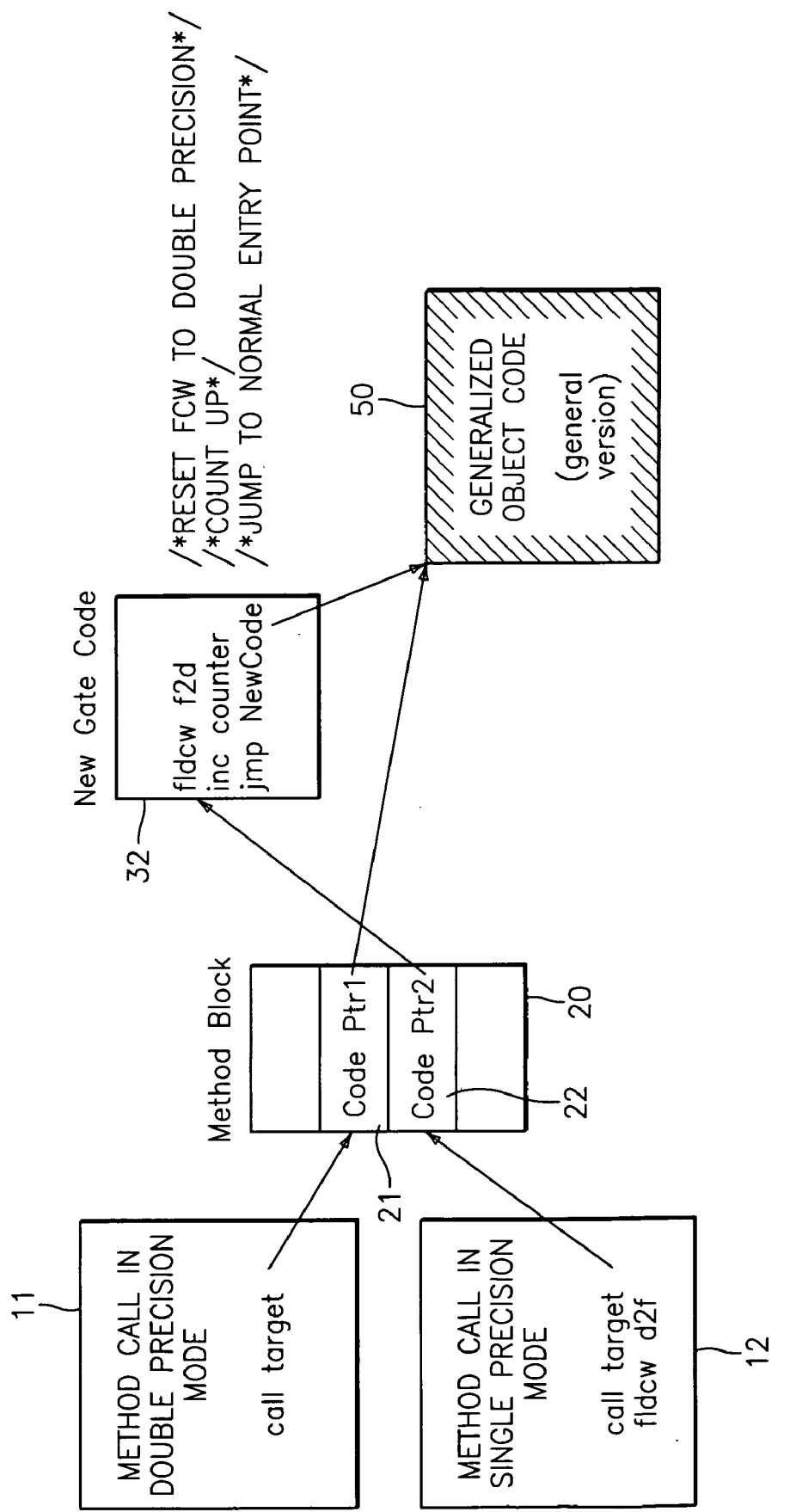
FIG. 3 shows the data structure generated by the runtime routine for realizing the operation according to the first embodiment, showing a typical data structure after a first compilation.
Figure 4:
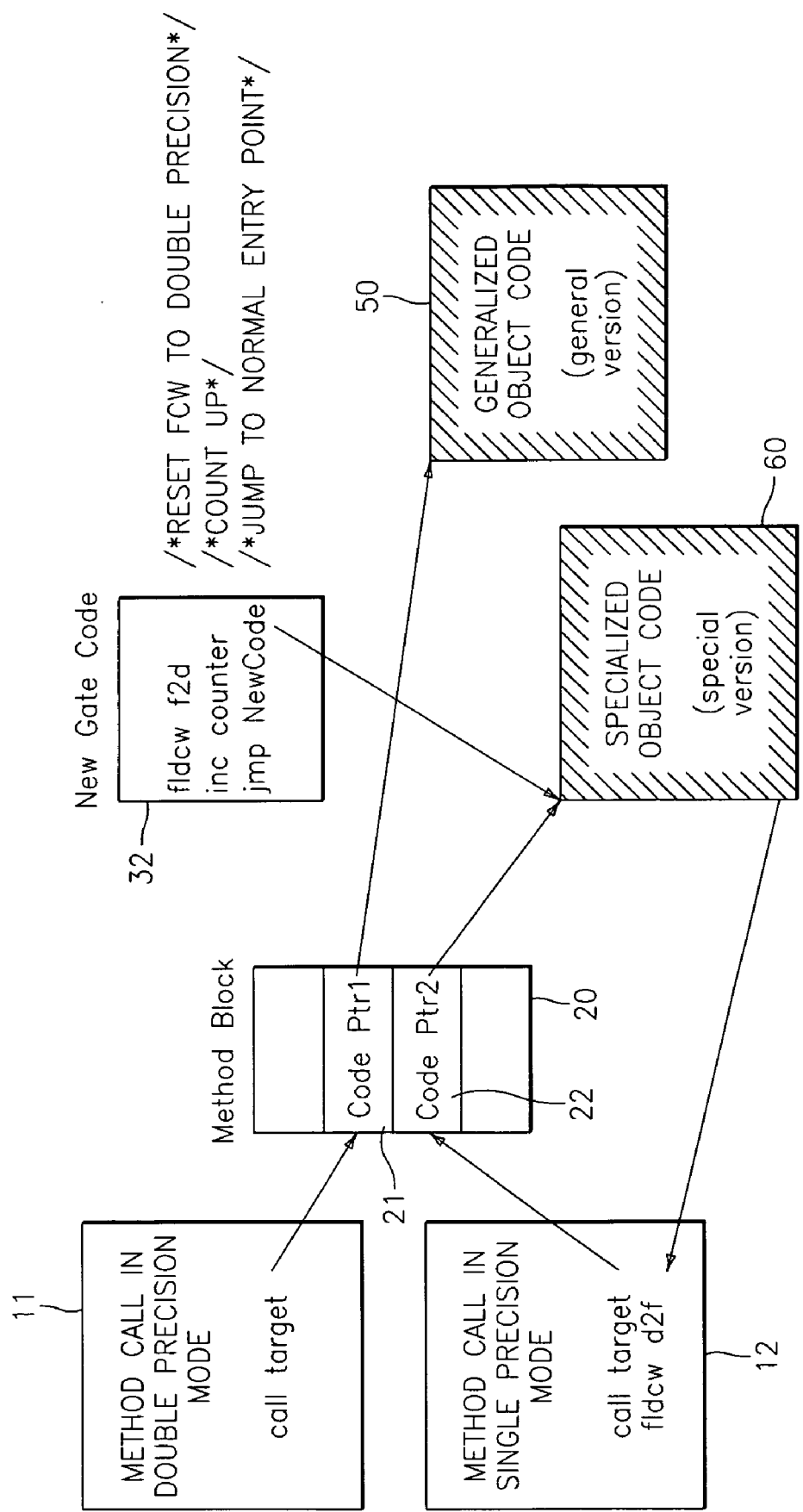
FIG. 4 shows the data structure generated by the runtime routine for realizing the operation according to the first embodiment, showing the data structure in the case in which a specialized object code is generated.

FIGS. 2 to 4 show data structures generated by a runtime routine for realizing the operation according to this embodiment. FIG. 2 shows an initial state, FIG. 3 shows a typical data structure after a first compilation, and FIG. 4 shows the data structure in the case where the program conversion method is executed. In contrast, FIG. 5 shows a data structure generated by a prior-art runtime routine.

Figure 5:
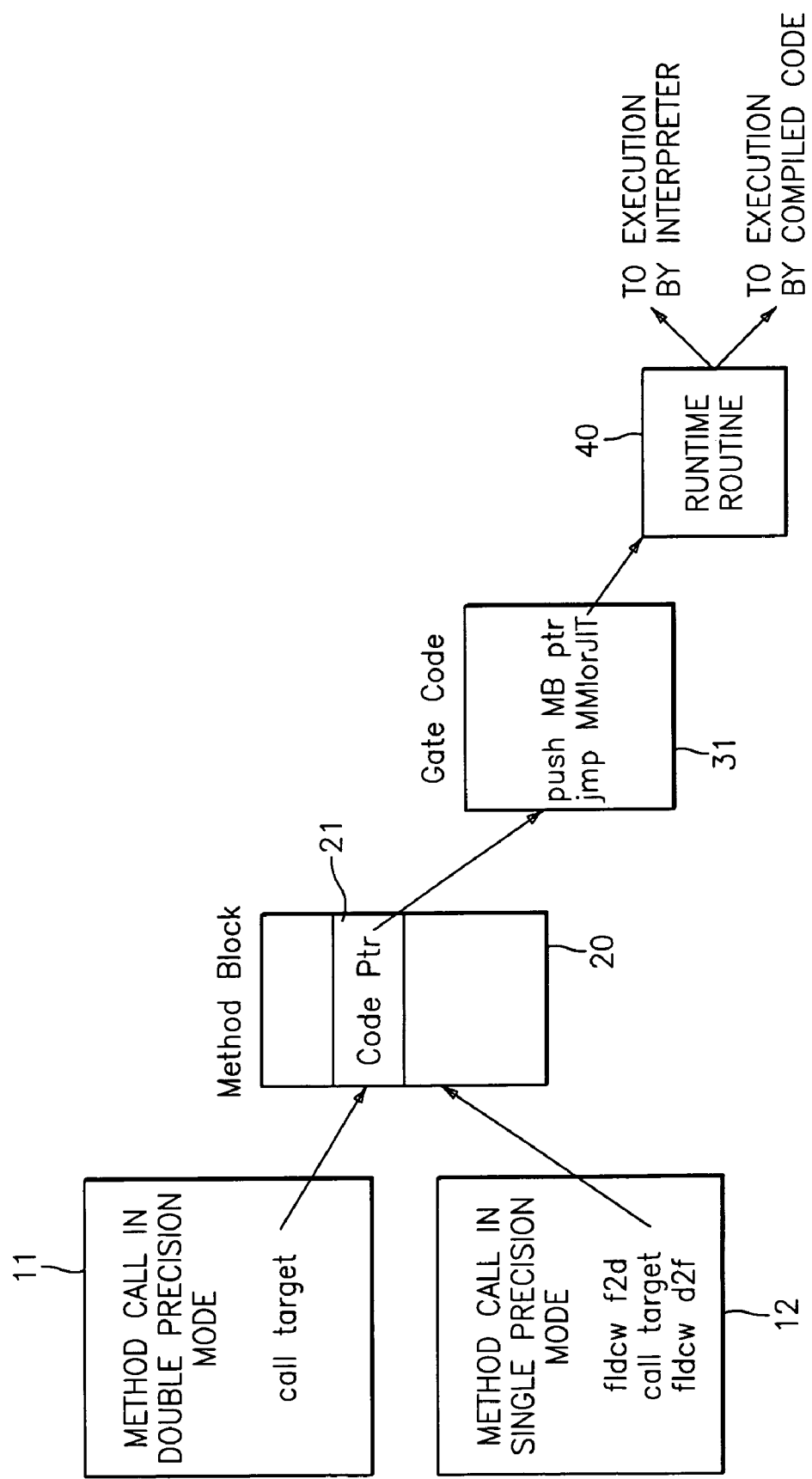
FIG. 5 shows a data structure generated by a prior-art runtime routine.

As shown in FIGS. 2 and 5, if methods 11 and 12 constituting the program are executed and a method call "call target" (a call instruction) is performed, the program execution unit 200 first refers to a corresponding entry in a method block 20. Then, from a registration point for a code address of a target method to be called (hereinafter, referred to as a target method) which is stored in the entry in the method block 20, via a gate code 31 corresponding to the entry, and via runtime routine 40, the program execution unit 200 executes the target method in the interpreter or in the compiled code. After executing the target method, the program execution unit 200 returns to the caller methods 11 and 12.

FIG. 5 shows the prior art data structure; in contrast, in the embodiment of the present invention shown in FIG. 2, in addition to a normal entry 21 (Code Ptr1) which is also shown in FIG. 5, a single precision mode dedicated entry 22 (Code Ptr2) is provided as the registration point for the code address of the target method in the method block 20. Depending on the current mode of the FCW at each call site of the caller methods 11 and 12, either the normal entry 21 or the single precision mode dedicated entry 22 is called accordingly. That is, if the target method is called from the caller method 12 where the single precision mode is selected, the newly provided single precision mode dedicated entry 22 is called.

In addition, as a gate code 32 corresponding to the single precision mode dedicated entry 22, the following codes are provided for:
1) setting the FCW to the double precision (fldcw f2d);
2) incrementing a dedicated counter (a single precision mode counter or F-mode counter) (inc counter); and
3) jumping to the normal gate code entry (jmp Gate).

In the method call in the single precision mode, it is not necessary to jump to a single precision dedicated code. That is, the called target method may be a method where the double precision mode is selected. Therefore, as shown in the caller method 12, at a return address right after a call instruction (call target), that is, after the called target method is executed, an instruction is generated for restoring the FCW to the single precision mode (fldcw d2f). A value of the single precision mode counter is retained in the memory 300 and referred to by the compiler 100 in the compilation as a means for obtaining information regarding whether the target method is called in the double precision mode or in the single precision mode, as will be described below.

Referring to the prior art shown in FIG. 5, in the method call in the single precision mode, according to a principle of fixing the double precision mode at method boundaries, as seen in the caller method 12, the FCW is switched to the double precision mode (fldcw f2d) before the call instruction (call target), and the FCW is switched back to the single precision mode (fldcw d2f) after the call instruction (call target).

In the state shown in FIG. 2, for the method call in the single precision mode, the FCW is set to the double precision mode at a method boundary, as in the prior art, by the gate code 32, and is restored to the single precision mode again after returning to the call point via a normal path. However, in this state, the call path under the single precision mode will suffer overhead such as incrementing the counter or performing the jump instruction in the gate code 32.

Next, the case will be considered where the target method called from the caller methods 11 and 12 is compiled. If the program is repeatedly executed and a counter value for counting the execution frequency of the target method exceeds a predefined threshold, the target method is compiled by the compiler 100, the compiler 100 acting as code generation means to generate the object code, and the execution of the target method is transferred from interpretation to execution of the compiled code.

In the compilation by the compiler 100, by checking the value of the single precision mode counter retained in the memory 300 and comparing it with the counter value for transferring from the interpreter to the compiler, it is possible to know which is more frequent between the single precision or the double precision in the settings of the FCW modes in the callers.

If the value of the single precision mode counter is small, then assuming that the method boundary is in the double precision mode, a generalized object code (general version) 50 is generated (as in the prior art). FIG. 3 shows the data structure in this case.

The generalized object code 50 is registered in the normal entry 21 of the code address in the method block 20. In addition, the jump instruction in the gate code 32 corresponding to the single precision mode dedicated entry 22 is rewritten such that the generalized object code 50 is assigned as a target of the jump address.

Below, recompilation is considered where the target method is a frequently called method (hot method) at runtime.

With respect to the call to the target method, if the value of the single precision mode counter in the gate code 32 corresponding to the single precision mode dedicated entry 22 is large enough, it is determined that the frequency of calls in the single precision mode (that is, from the caller method 12) is high. When the target method satisfies a condition to compile using the single precision mode as the base precision mode, recompilation will be executed to generate a specialized object code version for a direct call in the single precision mode. The condition may be defined arbitrarily: for example, a threshold may be set where a frequency of calling in the single precision mode is larger than a frequency of calling in the double precision mode. FIG. 4 shows the data structure in the case where a specialized object code (special version) 60 to be used for the direct call in the single precision mode is generated by the recompilation.

The generated specialized object code 60 is registered in the single precision mode dedicated entry 22 of the single precision dedicated code address in the method block 20. In addition, the entry code in the gate code 32 is rewritten to an unconditional jump instruction so as to jump directly to the specialized object code 60. Thereby, at a virtual method call site in the single precision mode, it may be possible to call a newly registered code automatically. In addition, at a static method or a nonvirtual method call site where the gate code 32 has been called directly, the specialized object code 60 will be called directly after the next invocation, according to an existing back patching mechanism.

Finally, the specialized object code 60 dedicated to the single precision mode slides a pointer of the return address by a fixed length byte, thereby skipping the instruction for resetting the FCW to the single precision mode (fldcw d2f) placed immediately after the call instruction (call target) in the caller method 12.

In addition to a procedure generating the specialized object code 60 in the recompilation, depending on an execution state of the target method, when the target method is compiled for the first time from the initial state as shown in FIG. 2, if the value of the single precision mode counter is already large enough (for example, if it exceeds 90 percent of the threshold for transferring from the execution in the interpreter to the execution in the compiler), the specialized object code 60 for the single precision mode may be generated without first generating the generalized object code 50 which assumes the call in the double precision mode. In this case, in order to keep the possibility of executing the normal compilation (the generation of the generalized object code 50) after executing the compilation generating the specialized object code 60, the value of the counter for transferring from the execution in the interpreter to the execution in the compiler needs to be adjusted (for example, by resetting the counter to a value of the threshold minus the F-mode counter value).

Figure 6:
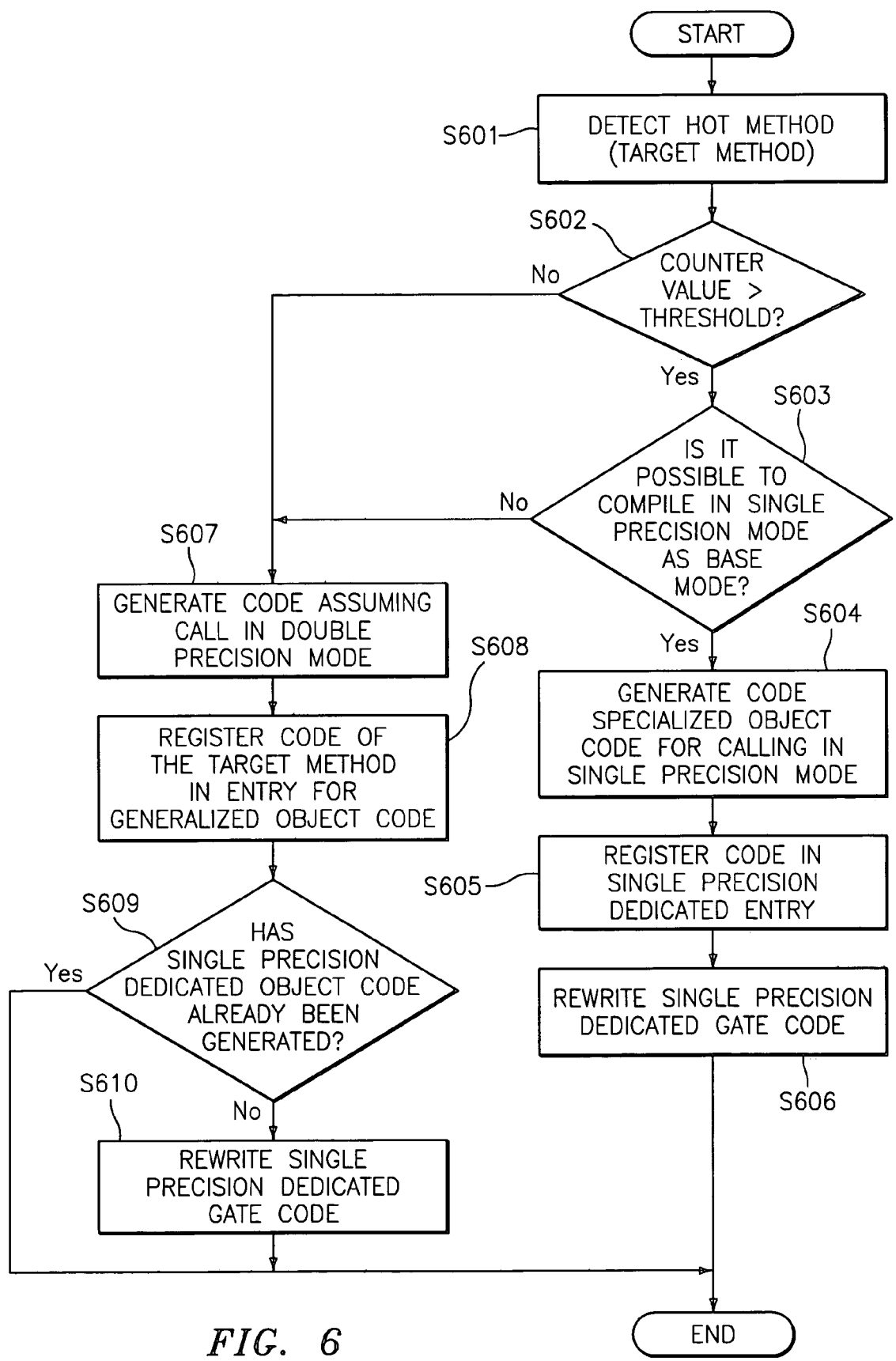
FIG. 6 is a flow chart showing a process of performing specialization according to the first embodiment of the present invention.

FIG. 6 is a flowchart showing a process of specializing the program according to this embodiment, as described above with references to the data structures shown in FIGS. 2 to 4.

As shown in FIG. 6, if a frequency with which a predetermined method (the target method in the above description) is called is high enough (the hot method is detected), and the target method is compiled, then the compiler 100 first examines whether the value of the single precision mode counter in the gate code 32 exceeds the threshold (that is, whether a preset condition is satisfied) (steps 601 and 602).

If the value of the single precision mode counter exceeds the threshold, the compiler 100 then determines whether it is possible to compile the target method using the single precision mode as the base mode (step 603). This may be determined by counting the number of single precision computations, double precision computations, and method call instructions, and analyzing the entire target method to calculate whether it is less expensive in terms of overhead to select the single precision mode as the base mode and switch the FCW to the double precision mode as necessary, or to select the double precision mode as the base mode and switch the FCW to the single precision mode as necessary (or to prevent loss of precision using the memory).

If it is determined that it is possible to compile the target method using the single precision mode as the base mode, the compiler 100 then generates the specialized object code 60 for calling in the single precision mode (step 604). Then the compiler 100 registers the specialized object code 60 in the single precision mode dedicated entry 22 in the method block 20 (step 605), converts (fldcw f2d) and (inc counter) to (nop) (that is, deletes (fldcw f2d) and (inc counter)) in the single precision dedicated gate code 32, rewrites the jump address to an address of the specialized object code 60, and completes the process (step 606).

On the other hand, if the value of the single precision mode counter does not exceed the threshold at step 602, or if it is determined that it is not possible to compile the target method using the single precision mode as the base mode in step 603, the compiler 100 generates the generalized object code 50 assuming the call in the double precision mode (step 607) and registers the generalized object code 50 in the normal entry 21 in the method block 20 (step 608).

Next, the compiler 100 examines whether the single precision dedicated object code 60 has already been generated for the target method (step 609). If the specialized object code 60 has not been generated yet, in order to use the generalized object code 50 thereafter, the compiler 100 rewrites the jump target address in the single precision dedicated gate code 32 from the gate code 31 to an address of the generalized object code 50, and completes the process (step 610). On the other hand, if the single precision dedicated object code 60 (the specialized object code) has been already generated, the compiler 100 completes the process since the specialized object code 60 may be used with respect to the call in the single precision mode.

As described above, according to the first embodiment, the specialized code dedicated to the single precision is generated with respect to the methods frequently called from the caller method in the single precision mode when the double precision mode is selected as default. Then, by calling the specialized code directly from the caller method in the single precision mode, it is possible to reduce a redundant execution of expensive instructions such as switching the FCW precision mode or writing into and reading from the memory.

In addition, since the specialized code is generated based on an execution history of the program with respect to the methods frequently called from the caller method in the single precision mode, unnecessary increase in code size can be avoided.

2. Second Embodiment

In the second embodiment, the target method to be compiled is called in the precision mode of the caller method. On compiling the target method, the compiler assumes the precision mode at the entry and the exit of the target method to be a calling precision mode (the precision of the caller method). The execution of the generated code is to be started in the assumed precision mode and ended in the same precision mode. A method of preventing loss of precision in the floating-point computation according to the second embodiment is realized in the computer system configured as shown in FIG. 1, as in the first embodiment.

In a program for executing the single precision computations, it is often the case that the methods for executing the single precision computations call each other. Therefore, if a method executing in the single precision mode calls another method for executing the single precision computations (hereinafter, this type of call will be referred to as a target status), overhead can be avoided if the call is performed without switching the FCW precision mode or writing into and reading from the memory.

If, as in Java®, the double precision mode is selected as default at method boundaries, then it is preferable to avoid the following four kinds of overhead due to redundant mode conversions in the target status:

when a method A calls a method B in the target status:
a) changing the mode from single precision to double precision in the method A;
b) changing the mode from double precision to single precision at the entry to the method B; and when the control is returned from the method B to the method A:
c) changing the mode from single precision to double precision in the method B;
d) changing the mode from double precision to single precision in the method A.

In this embodiment, as described above, the target method is called in the precision mode of the caller method. Therefore, if a single target method is called by different caller methods in different precision modes, the multiple versions of code corresponding to the different precision modes are generated with respect to the single target method. If it is necessary to restrict the multiple version code generation to limit, for example, code size or compile time, then once the target method is compiled in any precision mode, thereafter, even when the method is called in a different precision, the code corresponding to the different precision may not be generated. In that case, a target code will be called via a code for matching the precision. In addition, with respect to compilation operating under such restrictions, the first embodiment may also be applied.

As described above, in this embodiment, when the compiler 100 as the code generation means compiles the target method, it assumes that the call is executed in the precision mode of the caller method, and generates an optimized code specifically for the target method. If the call precision is double precision, the compiler 100 compiles assuming the double precision mode (the code generated in a compilation assuming the double precision mode is referred to as a double precision code), and if the call precision is single precision, the compiler 100 compiles assuming the single precision mode (the code generated in a compilation assuming the single precision mode is referred to as a single precision code). If the double precision computations and the single precision computations are mixed, the compiler 100 compiles by combining the approaches for preventing loss of precision using switching of the precision mode (Approach 1, described above) or writing and reading in the memory (Approach 2, described above).

In addition, with respect to the compiled target method, depending on the precision mode assumed when generating a compiled code, the compiler 100 registers a flag indicating the single precision code or the double precision code (a default precision mode) in the compiled code of the target method or in the runtime routine. Furthermore, if the switching of the precision mode (Approach 1) is executed with respect to the compiled method, the compiler 100 registers a section in which the precision mode is changed and also registers the precision mode.

If there is only the single precision code in the compiled code, and the compiled code may be called by a method executed in the interpreter, it is assumed that the interpreter operates constantly in the double precision mode, and the precision mode is switched before and after the call. Then, the precision mode is switched to the single precision mode before the compiled code is executed, and the precision mode is switched back to the double precision mode on returning from the compiled code.

A target method may be categorized as either a static method or a virtual method. In each case, either the single precision code is generated or the double precision code is generated. Further, if the target method is the virtual method and is called virtually, then it is either called from the single precision code or it is called from the double precision code. Therefore, with respect to the target method, the compiled code for the case of being called from the single precision code and the compiled code for the case of being called from the double precision code are generated for their respective cases, and one of the codes is selected depending on an execution status of the program.

Next, code generation by the compiler 100 will be further described by dividing it into specific cases.

In a separate compilation environment of the compiler 100, two possibilities are considered involving the target method to be compiled (referred to for this description as a Method B) and the caller method (referred to for this description as a Method A), as follows:

Case 1: Method A has been already compiled, and now Method B is being compiled; and Case 2: Method A has not been compiled yet, and now Method B is being compiled.

With respect to the Case 1, the compiler 100 executes code generation as follows.

If the Method A is the double precision code, when the Method B contains the double precision computations only, the compiler 100 compiles in the double precision mode (the double precision code); when the Method B contains the single precision computations only, the compiler 100 compiles in the single precision mode (the single precision code). If the double precision computations and the single precision computations are mixed, the compiler 100 calculates the execution cost and compiles either in the double precision code or the single precision code, and as necessary, prevents loss of precision using the existing approaches (Approach 1 and Approach 2, described above) such as switching of the precision mode or writing and reading in the memory, or applies the fourth embodiment as will be described later.

On the other hand, if the Method A is the single precision code, when the Method B contains the single precision computations only, the compiler 100 compiles in the single precision mode (the single precision code). Otherwise, the compiler 100 compiles in the double precision mode (the double precision code), and as necessary, prevents loss of precision using the existing approaches (Approach 1 and Approach 2, described above) by combining switching of the precision mode and writing and reading in the memory, or applies the fourth embodiment as will be described later.

Figure 7:
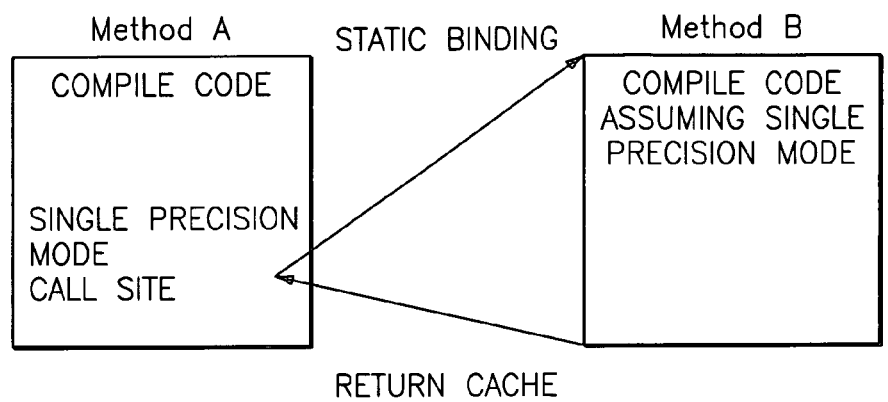
FIG. 7 illustrates a code generation in the case that a caller method which calls a target method to be compiled has been already compiled, in a second embodiment of the present invention.

FIG. 7 conceptually illustrates code generation in the above described case.

With respect to the Case 2, the compiler 100 executes code generation as follows.

When the Method B contains the double precision computations only, the compiler 100 compiles in the double precision mode (the double precision code); when the Method B contains the single precision computations only, the compiler 100 compiles in the single precision mode (the single precision code). If the double precision computations and the single precision computations are mixed, the compiler 100 calculates the execution cost and compiles either in the double precision code or the single precision code, and as necessary, prevents loss of precision using the existing approaches by combining the switching of the precision mode and the writing and reading in the memory. Whether the compiler 100 generates the double precision code or the single precision code depends on the way of combining the switching of the precision mode and the writing and reading in the memory. Alternatively, the fourth embodiment may be applied as will be described later.

Since of Method A is executed by the interpreter, and the interpreter is typically executed with fixed precision mode, the precision mode is switched as necessary in a glue code for calling the compiled code. That is, if the interpreter is executed in the double precision mode, when Method B is the double precision code, the compiled code is called without switching the precision mode. On the other hand, when Method B is the single precision code, in the glue code, the precision mode is switched from the double precision mode to the single precision mode, then the compiled code is called, and the precision mode is switched back to the double precision mode on returning to Method A.

Figure 8:
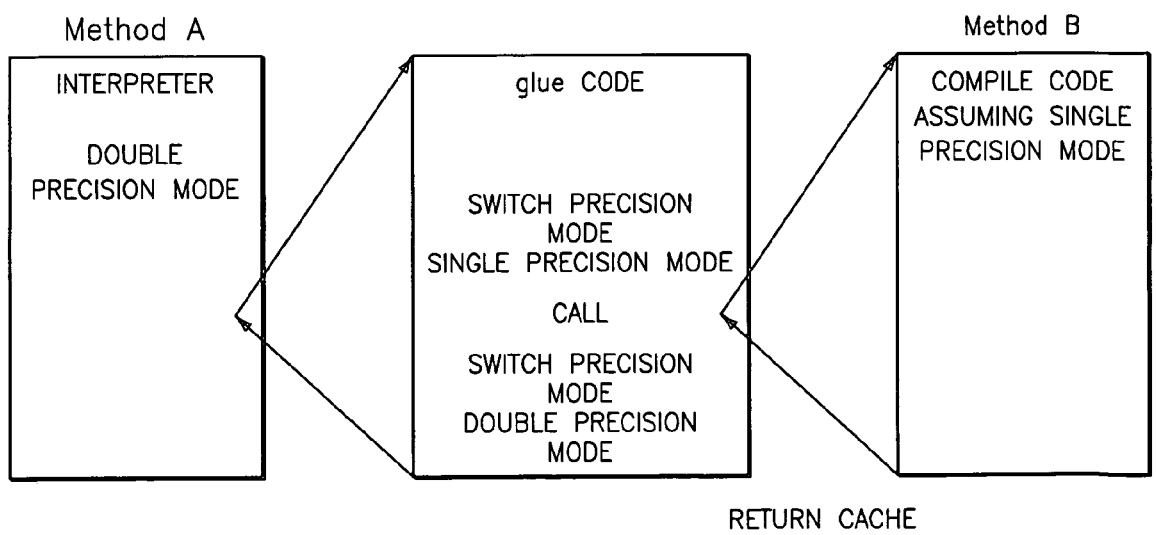
FIG. 8 illustrates code generation in the case that the caller method which calls the target method to be compiled has not been compiled yet, in the second embodiment.

FIG. 8 illustrates the code generation in the above described case.

Figure 9:
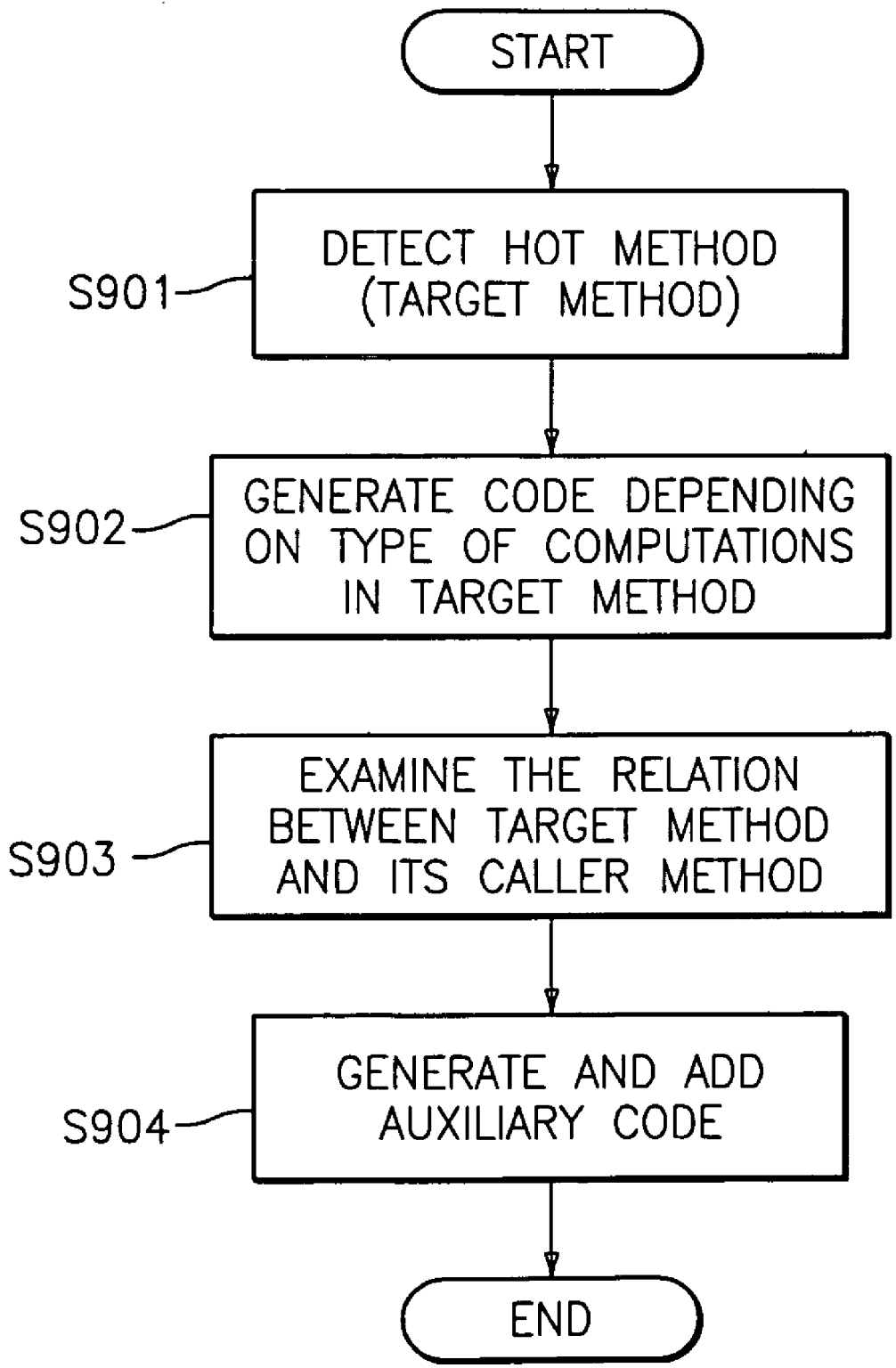
FIG. 9 is a flow chart illustrating a compilation procedure according to the second embodiment of the present invention.

FIG. 9 is a flowchart illustrating a compilation procedure as described above.

As shown in FIG. 9, if the compiler 100 detects and compiles a hot method, it generates the compiled code depending on the type of the computations (the single precision computations only, the double precision computations only, or a mixture of both) in the target method to be compiled, and temporarily stores the code in the memory 300 (steps 901 and 902). Next, the compiler 100 examines a relation between the target method and the caller method which calls the target method (step 903), generates an auxiliary code depending on the determined relation, as described in FIGS. 7 and 8, and adds the auxiliary code to the code stored in the memory 300, which is generated in step 902. That is, the compiler 100 inserts the code for switching the precision mode into the code of the target method or the code of the caller method, or alternatively into the glue code if the caller method has not been compiled yet (step 904).

As described above, according to the second embodiment, if the target method is compiled, assuming that the compilation is started and ended in the same precision mode as in the caller method, code generation can be performed to optimize the target method to be compiled. Therefore, it is possible to reduce a redundant switching of the precision mode which is caused by selecting a default precision mode (for example, the double precision mode) at method boundaries.

3. Third Embodiment

In the above described first embodiment, the code in which the single precision mode is selected as the base mode is generated for the methods frequently called in the single precision mode during execution. In the second embodiment, the code is generated by setting the computation precision depending on the type of the computations within the target method. However, in some programs, there are, for example, methods where the code has to be generated in the double precision mode since the methods were originally written to execute the computations in the double precision mode even though the computations themselves may be executed sufficiently in the single precision mode, or methods where the computations requiring the double precision mode appear sporadically though most of the computations are in the single precision mode. With respect to such methods, the code can not be generated in the single precision mode using the first and second embodiments.

Therefore, the third embodiment further improves the effectiveness of the code generation based on the first and second embodiments, by replacing the computations in the method as a preprocess in compiling the method.

In this embodiment, with respect to the method for which the code is generated in the double precision mode, since the method is written to execute the computations in the double precision mode even though the computations themselves may be sufficiently executed in the single precision mode, the computations in the target method are replaced. This code rewriting process is referred to as an excessive-precision optimization (XPO).

There are various possible causes for the code being generated in an excessive double precision mode, for example, the Method API provided by Java® is only for double precision computation functions, or a programmer may specify an excessive precision when writing the method. In this embodiment, a precision bit number of a computation result is propagated based on a relation between definition and use (a def-use relation) of a function. Then, if the same result may be obtained in the single precision computation, the double precision computation in the target method is replaced with the single precision computation. A useless memory write for degrading the computation precision can thus be eliminated.

The excessive-precision optimization for preventing loss of precision in the floating-point computation in the third embodiment is realized in the computer system configured as shown in FIG. 1, as in the first embodiment.

Figures 10, 11:
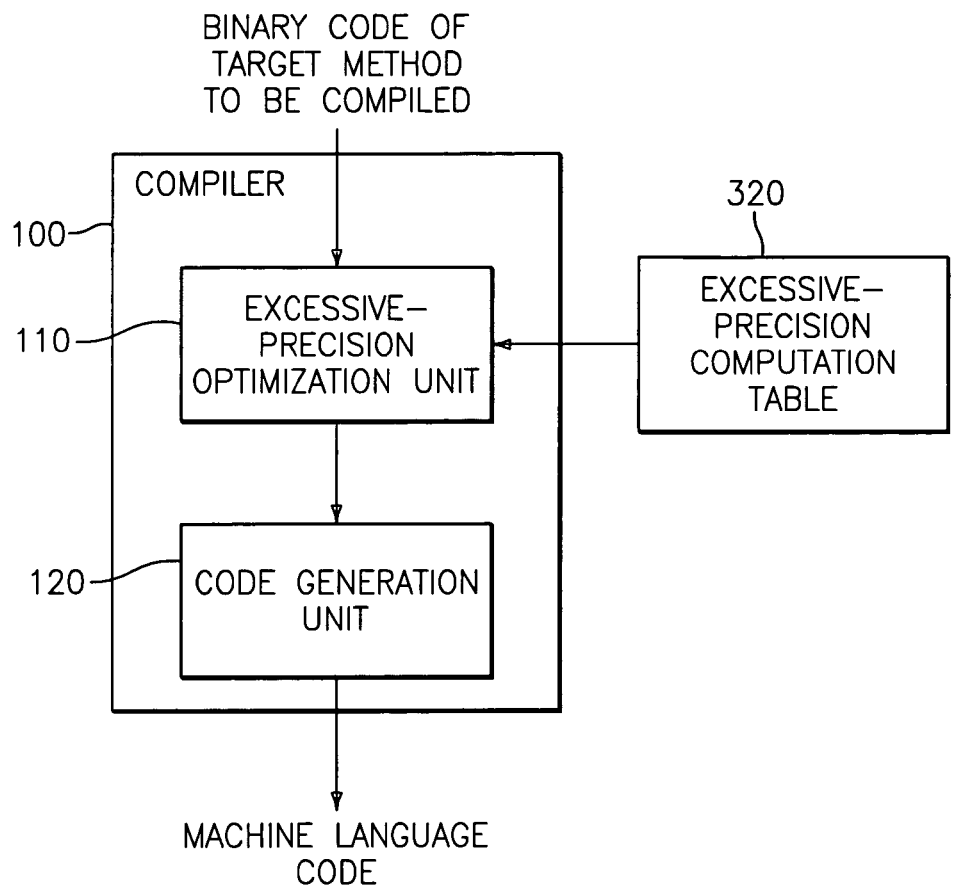
FIG. 10 illustrates a function of a compiler in a third embodiment of the present invention.
FIG. 11 shows an excessive-precision computation table used in the third embodiment.

FIG. 10 is a block diagram illustrating a function of the compiler 100 in this embodiment.

As shown in FIG. 10, the compiler 100 of this embodiment is provided with an excessive-precision optimization unit 110 for executing the excessive-precision optimization process with respect to the target method to be compiled, and a code generation unit 120 for converting a binary code of the target method on which the excessive-precision optimization process is applied into a machine language code. The excessive-precision optimization unit 110 and the code generation unit 120 are virtual software blocks which are realized in the CPU controlled by the program stored in the memory 300. It should be noted that an example configuration specific to this embodiment is shown in FIG. 10. It should be appreciated that, for example, in addition to the configuration shown in the figure, means for parsing the binary code of the target method to be compiled or means for executing various optimization processes other than the excessive-precision optimization according to this embodiment may also be provided.

The excessive-precision optimization unit 110, which is code rewriting means, detects a portion of the target method to be compiled in which an excessive-precision computation (the double precision computation) is executed, and replaces the portion of the target method with an appropriate lower precision computation (the single precision computation), as the preprocess of the code generation by the code generation unit 120. Specifically, the excessive-precision optimization unit 110 first determines whether the computation is the excessive precision with respect to each of the double precision computations (functions) in the target method, and replaces the computation which is determined to be the excessive-precision computation with the single precision computation. At this point, it is possible to execute a data-flow analysis in the compilation and determine mechanically whether the computation is the excessive-precision computation or not with respect to all of the double precision computations detected. Also, it is possible to, for example, refer to the execution profile stored in the memory 300, collected through the execution of the method, and determine whether the computation is the excessive-precision computation or not with respect to the double precision computations which are frequently executed.

A certain floating-point computation C is determined to be the excessive-precision computation if it satisfies two conditions as follows:

Condition (1) A function F (a code sequence for processing input in the computation C and providing output as a result, including both one instruction computation and a function calling another method) may provide the same result even by computing it in a lower precision mode (the single precision mode) if input values are certain restricted values (for example, input values whose mantissa can be represented in the single precision); and Condition (2) all of the input values are the restricted values.

This embodiment provides an excessive-precision computation table 320 in which the floating-point computations satisfying these two conditions are listed, and uses this table to determine whether the computation is the excessive-precision computation using the excessive-precision optimization unit 110. FIG. 11 shows an example of the excessive-precision computation table 320. As shown, in the excessive-precision computation table 320, for each type of the floating-point computations (computation class) satisfying Condition (1), the restriction on the input values for satisfying Condition (1) is registered. The excessive-precision computation table 320 is created with respect to the floating-point computations which are known previously and empirically to potentially be the excessive-precision computation, and is stored in the memory 300.

Figure 12:
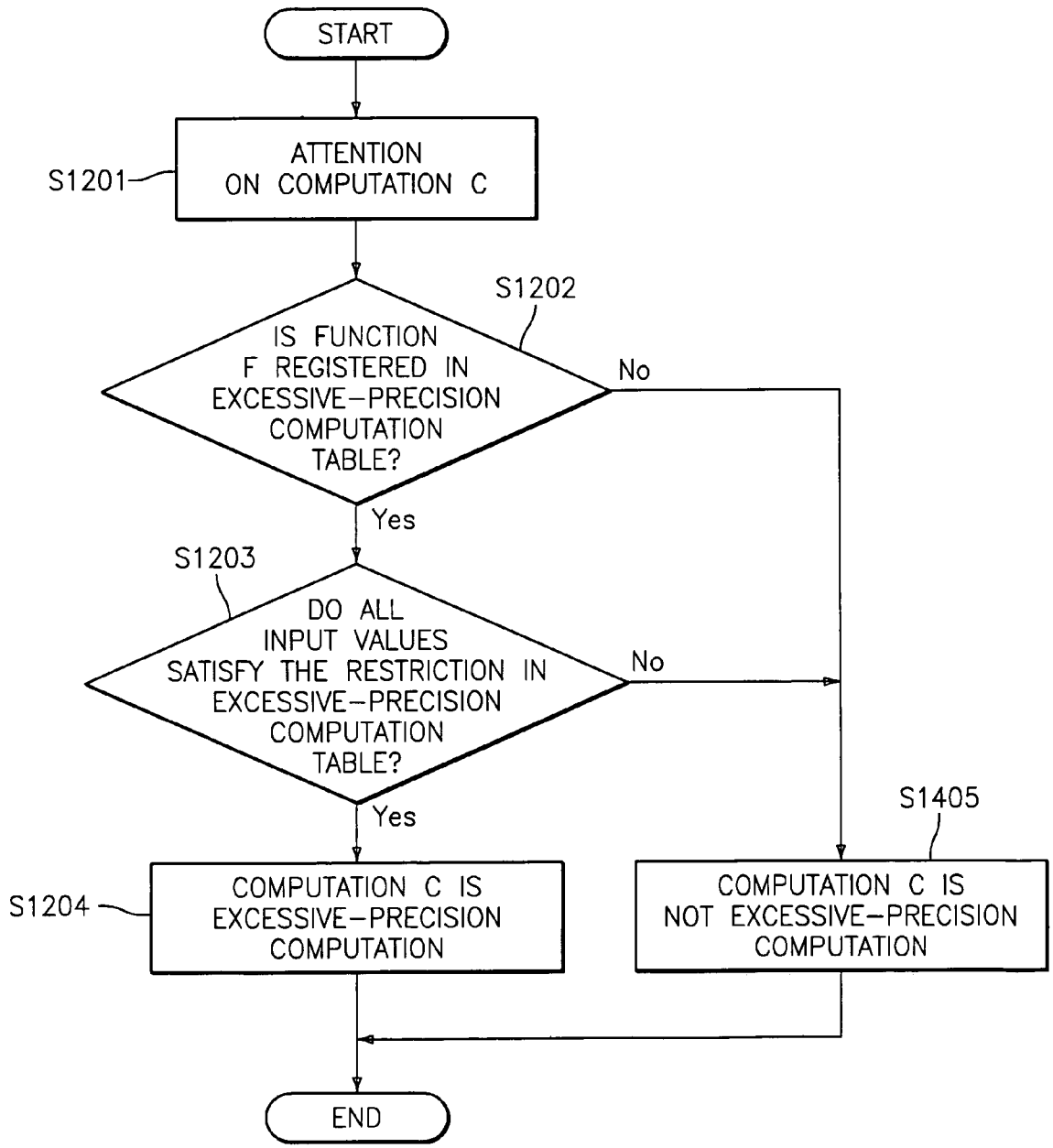
FIG. 12 is a flow chart illustrating a process flow in which an excessive-precision optimization unit determines whether it is an excessive precision with respect to a floating point computation.

FIG. 12 is a flowchart illustrating the process by which the excessive-precision optimization unit 110 determines whether the computation is the excessive-precision computation or not with respect to a floating point computation C. The excessive-precision optimization unit 110 executes the following process as shown in FIG. 12, with respect to each of the floating-point computations in the target method to be compiled.

First, the floating-point computation C is considered (step 1201). Then, it is determined whether the function F in this computation C is registered in the excessive-precision computation table 320 (step 1202). If the function F is registered, next it is determined whether all of the input values for the function F satisfy the restriction registered in the excessive-precision computation table 320 (step 1203). If all of the input values satisfy the restriction, the computation C is determined to be the excessive-precision computation (step 1204). On the other hand, if the function F is not registered in the excessive-precision computation table 320, or any of the input values of the function F do not satisfy the restriction registered in the excessive-precision computation table 320, the computation C is determined not to be the excessive-precision computation (steps 1202, 1203 and 1205).

Figure 13:
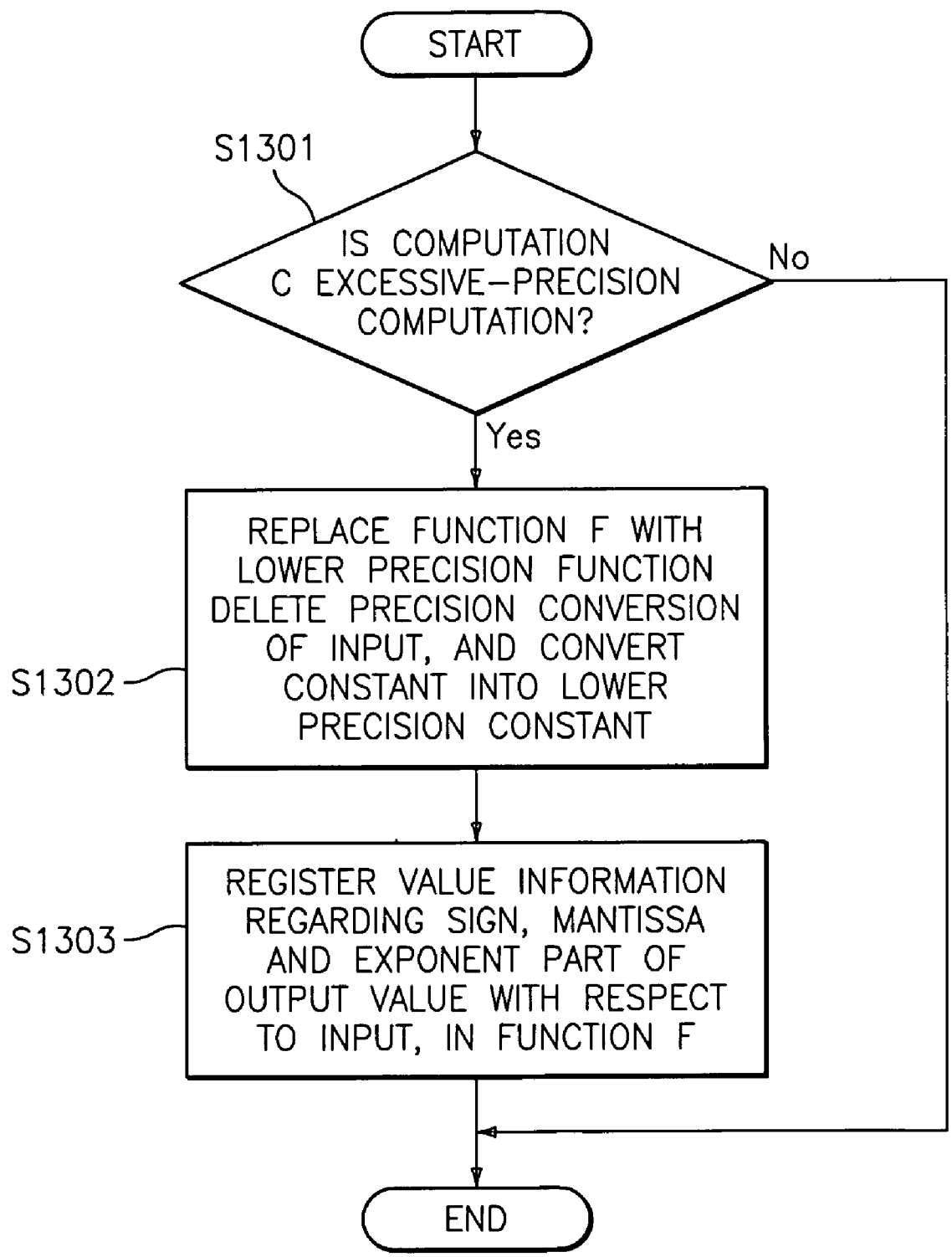
FIG. 13 is a flow chart illustrating a process flow for replacing the computation determined to be an excessive-precision computation with a lower precision computation.

FIG. 13 is a flowchart illustrating a process for replacing the computation C determined to be the excessive-precision computation with the lower precision computation (the single precision computation). The excessive-precision optimization unit 110 executes the following process as shown in FIG. 13, with respect to each of the floating-point computations in the target method to be compiled.

First, it is determined whether the computation C is the excessive-precision computation or not (step 1301). This determination is based on the result of the process as shown in FIG. 12. If the computation C is the excessive-precision computation, the excessive-precision optimization unit 110 replaces a function F with the lower precision function, deletes an instruction for converting the precision from the input, and converts a constant into another constant that represents the same value in the lower precision (step 1302). Then, the excessive-precision optimization unit 110 generates information regarding what values a sign, a mantissa and an exponent part of an output value with respect to the input may take respectively (hereinafter, referred to as value information), and registers the value information as attribute for the function F (in particular, for the code for providing the output) (step 1303).

The work of the excessive-precision optimization unit 110 is completed as described above. The result of this excessive-precision optimization process, that is, the method by which the excessive-precision computations are converted into the single precision computations, is retained in the memory 300, and will be used in the generation of the machine language code by the code generation unit 120.

Figure 14:
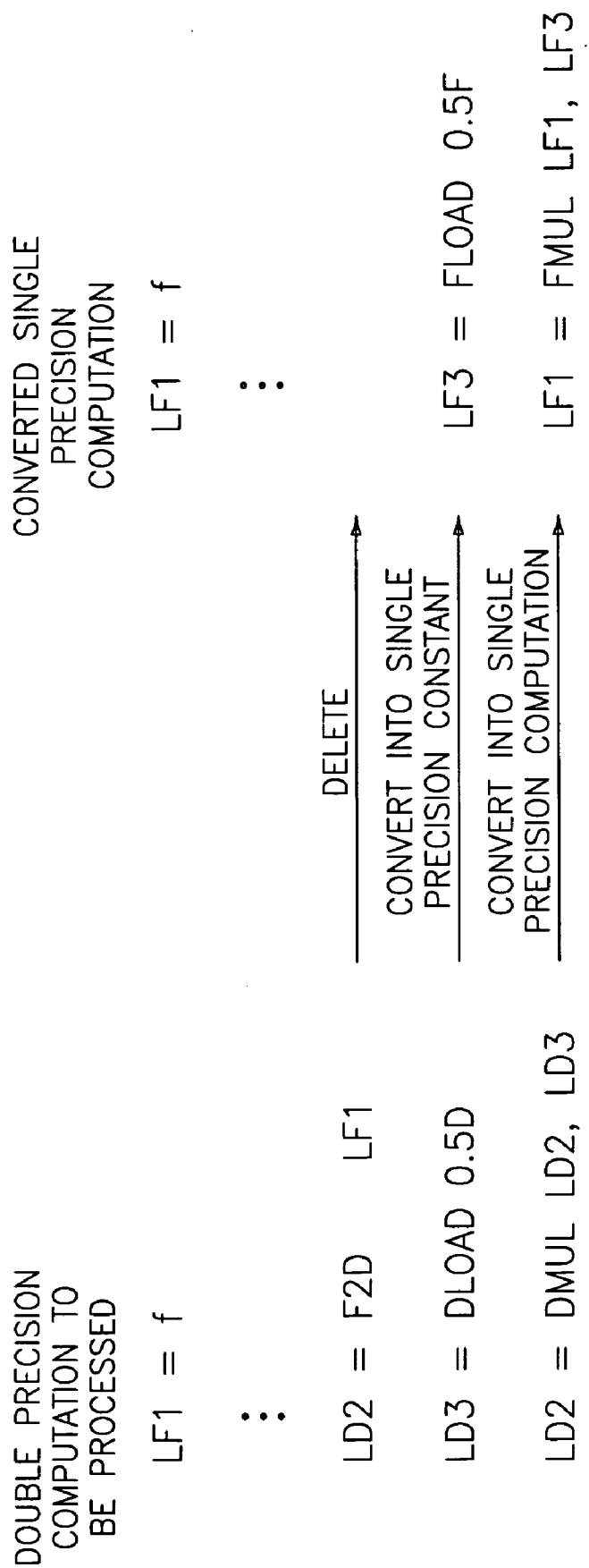
FIG. 14 shows an example of a pseudo-code for converting a double precision computation, which is an excessive-precision computation with respect to a specific floating-point computation, into a single precision computation, as in the third embodiment.
Figure 15:
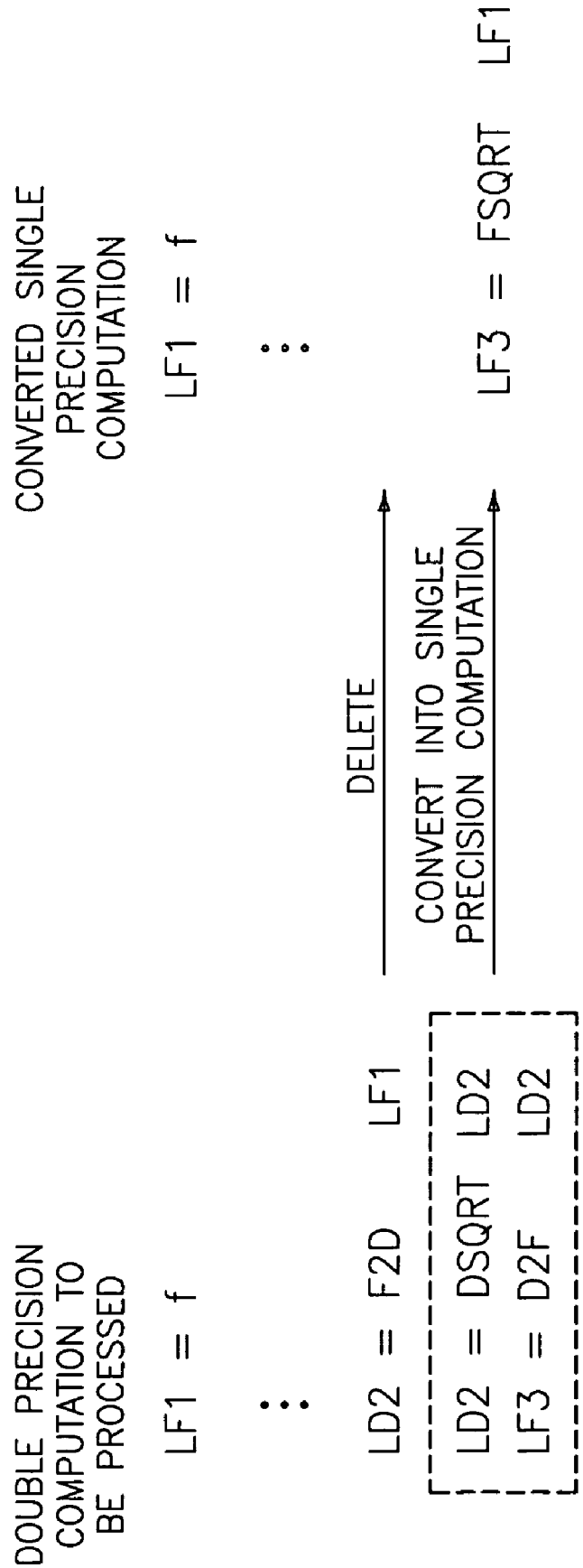
FIG. 15 shows an example of a pseudo-code for converting a double precision computation, which is an excessive-precision computation with respect to a specific floating-point computation, into a single precision computation, as in the third embodiment.

FIGS. 14 and 15 show examples for converting the double precision computation, which is the excessive-precision computation with respect to a specific floating-point computation, into the single precision computation. FIG. 14 shows an example as a pseudo-code for converting the double precision computation for multiplying a single precision floating-point value by a value of 0.5, into the single precision computation. FIG. 15 shows an example as a pseudo-code for converting into the single precision computation the double precision computation for obtaining a square root sqrt(v) of the single precision floating-point value and rounding it in the single precision.

In FIG. 14, f is an arbitrary computation leaving a single precision floating-point value as a result. LF1 and LF3 are variables having single precision floating-point values. LD2 and LD3 are variables having double precision floating-point values. F2D is an instruction for converting the single precision floating-point value into the double precision floating-point value. FLOAD is an instruction for loading the constant of the single precision floating-point value, and DLOAD is an instruction for loading the constant of the double precision floating-point value. FMUL is an instruction for multiplying the single precision floating-point values, and DMUL is an instruction for multiplying the double precision floating-point values.

In the double precision computation to be processed, the variable LF1 is assigned to the variable LD2 through the instruction F2D, the value of 0.5 is assigned to the variable LD3 by the instruction DLOAD, and the result of the instruction DMUL is assigned to the second variable LD2.

The case is considered where the determination by the excessive-precision optimization unit 110 (see FIG. 12) is executed with respect to this double precision floating-point computation. Now, the excessive-precision computation table 320 shown in FIG. 11 is referenced.

The instruction DMUL is registered in the excessive-precision computation table 320, and the actual value of the variable LD2 as the input is the variable LF1 having the single precision floating-point value, which satisfies the restriction on the input 1. Therefore, the excessive-precision optimization unit 110 determines this double precision computation to be the excessive-precision computation. Then the excessive-precision optimization unit 110 replaces the double precision computation with the single precision computation (see FIG. 13).

In the example shown in FIG. 14, the instruction for converting the precision LD2=F2D is deleted, the instruction DLOAD is converted into the instruction FLOAD for loading the single precision floating-point value 0.5 (LD3→LF3), and further the instruction DMUL is converted into the instruction FMUL for multiplying the single precision (LD2→LF1).

The process of the single precision conversion (the excessive-precision optimization process) by the excessive-precision optimization unit 110 is completed as described above.

In FIG. 15, f, LF1, LF3, LD2 and F2D are similar to the case in FIG. 14. D2F is an instruction for converting the double precision floating-point value into the single precision floating-point value. FSQRT is an instruction for computing the square root of the single precision floating-point value, and DSQRT is an instruction for computing the square root of the double precision floating-point value.

In the double precision computation to be processed, the variable LF1 is assigned to the first variable LD2 through the instruction F2D, the result of the instruction DSQRT for computing the square root of the double precision floating-point value of the first variable LD2 is assigned to the second variable LD2, and the result of the instruction D2F for converting the second variable LD2 into the single precision floating-point value is assigned to the variable LF3.

The case is considered where the determination by the excessive-precision optimization unit 110 (see FIG. 12) is executed with respect to this double precision floating-point computation. Now, the excessive-precision computation table 320 shown in FIG. 11 is referenced.

The combination of the instruction DSQRT and the instruction D2F is registered in the excessive-precision computation table 320, and the actual value of the first variable LD2 as the input is the variable LF1 having the single precision floating-point value, which satisfies the restriction on the input 1. Therefore, the excessive-precision optimization unit 110 determines this double precision computation to be the excessive-precision computation. Then the excessive-precision optimization unit 110 replaces the double precision computation with the single precision computation (see FIG. 13).

In the example shown in FIG. 15, the instruction for converting the precision LD2=F2D is deleted, a pair of the instruction DSQRT and the instruction D2F is converted into the instruction FSQRT for computing the square root of the single precision floating-point value (LD2+LF3→LF3).

The process of the single precision conversion (the excessive-precision optimization process) by the excessive-precision optimization unit 110 is completed as described above.

As described above, in this embodiment, the excessive-precision computations in the method are replaced with the single precision computations. Therefore, for example, if this embodiment is used with the first embodiment, then due to converting the excessive-precision computations into the single precision computations, the number of the target methods for which the specialized code for the single precision mode is generated can be increased. In addition, if this embodiment is used with the second embodiment, then due to converting the excessive-precision computations into the single precision computations, it may be possible to generate the code with a more appropriate precision mode in the target method.

It should be noted that though the excessive-precision computation table 320 is prepared in advance and stored in the memory 300 in this embodiment, it is also possible to dynamically add the entry of the excessive-precision computation table 320. That is, in the determination process described with respect to FIG. 12, if it is determined that the function F in the floating point computation C is not registered in the excessive-precision computation table 320 in step 1202, it can examine the computation C as to whether the computation C satisfies the Conditions (1) and (2) for determining the excessive-precision computation (that is, whether the result obtained from the computation C by using all sets of the input values and the result obtained by executing the computation C in the lower precision are the same). If the computation C satisfies the conditions, the function F and its input values are registered in the excessive-precision computation table 320. In other words, it is a method for constructing the excessive-precision computation table 320 on the fly at runtime. It should be noted that if it is determined that the computation C satisfies the Conditions (1) and (2), it is possible to register it in the excessive-precision computation table 320 and then move to the replacement process shown in FIG. 13. It is also possible to separate the process of creating the excessive-precision calculation table 320 and the determination process in FIG. 12, and further execute separately the determination process in FIG. 12 with respect to the computation C. However, since it requires large amount of time (process overload) to determine whether the computation C satisfies the Conditions (1) and (2), it is preferable to use the process only for important computations, or to use the process for a static compiler where this process overload is not an issue in the execution of the program.

4. Fourth Embodiment

The fourth embodiment further improves the effectiveness in the code generation according to the first and second embodiments, by separating code regions for executing the double precision computations, with respect to the target method containing both the single precision computations and the double precision computations.

In this embodiment, the code regions requiring the double precision computations are separated by performing a code analysis with respect to the target method to be processed, and dividing the codes in the target method into regions that include only the single precision computations (single precision regions) and other regions. This process is referred to as a precision region analysis (PRA).

Empirically, even if a target method includes both single precision computations and double precision computations, the single precision computations and the double precision computations may not appear in a complicated way (for example, alternately), and there may be code regions within the target method in which the single precision computations are to some extent continuous. Therefore, in this embodiment, the codes in the target method are examined according to a control flow to retrieve continuous single precision regions which include only the single precision computations. If the single precision regions are obtained, the precision mode of the CPU is set separately with respect to each of the continuous single precision regions, thereby controlling the precision mode on a finer level than a method level.

The precision region analysis for preventing loss of precision in the floating-point computation according to the fourth embodiment is realized in the computer system configured as shown in FIG. 1, as in the first embodiment.

Figure 16:
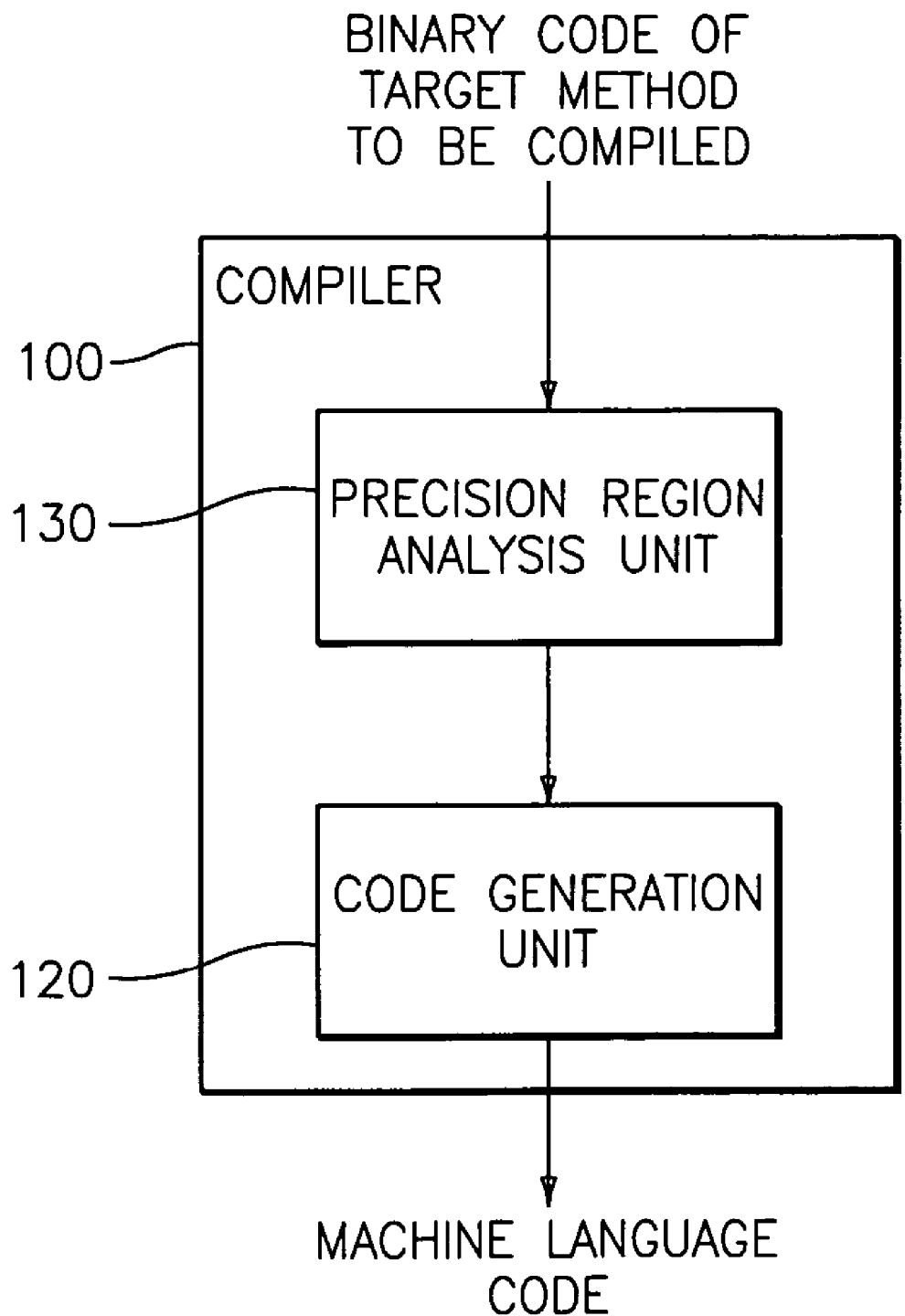
FIG. 16 illustrates the function of the compiler in a fourth embodiment of the present invention.

FIG. 16 is a block diagram illustrating the function of the compiler 100 in this embodiment.

As shown in FIG. 16, the compiler 100 of this embodiment is provided with a precision region analysis unit 130 for executing the precision region analysis process with respect to the target method to be compiled, and the code generation unit 120 for converting the binary code of the target method to which the precision region analysis process is applied into the machine language code. The precision region analysis unit 130 and the code generation unit 120 are virtual software blocks which are realized in the CPU controlled by the program stored in the memory 300. It should be noted that an example configuration specific to this embodiment is shown in FIG. 16. It should be appreciated that, for example, in addition to the configuration shown in the figure, means for parsing the binary code of the target method to be compiled or means for executing various optimization processes other than the precision region analysis according to this embodiment may be provided.

The precision region analysis unit 130, as the preprocess of the code generation by the code generation unit 120, executes the code analysis with respect to the target method to be compiled, according to the control flow, and retrieves the single precision regions so that they are as large as possible. Then, the precision region analysis unit 130 sets the precision mode of the CPU for each of the single precision regions obtained. Specifically, with respect to each of the single precision regions, as a method for preventing loss of precision in the floating-point computation, the precision region analysis unit 130 determines whether the method for switching the precision mode of the CPU (Approach 1, as described above) or the method for degrading the computation precision by writing into the memory and reading it again (Approach 2, as described above) is less expensive in terms of overhead. If the precision region analysis unit 130 finds Approach 1 to be less expensive, the precision region analysis unit 130 determines that the precision mode at an entry and an exit of the single precision region should switch to the single precision mode, thus determining that the single precision region will execute in the single precision mode. On the other hand, if the precision analysis unit 130 finds that Approach 2 incurrs less overhead, the precision region analysis unit 130 determines that the single precision region will execute in the double precision mode.

Figure 17:
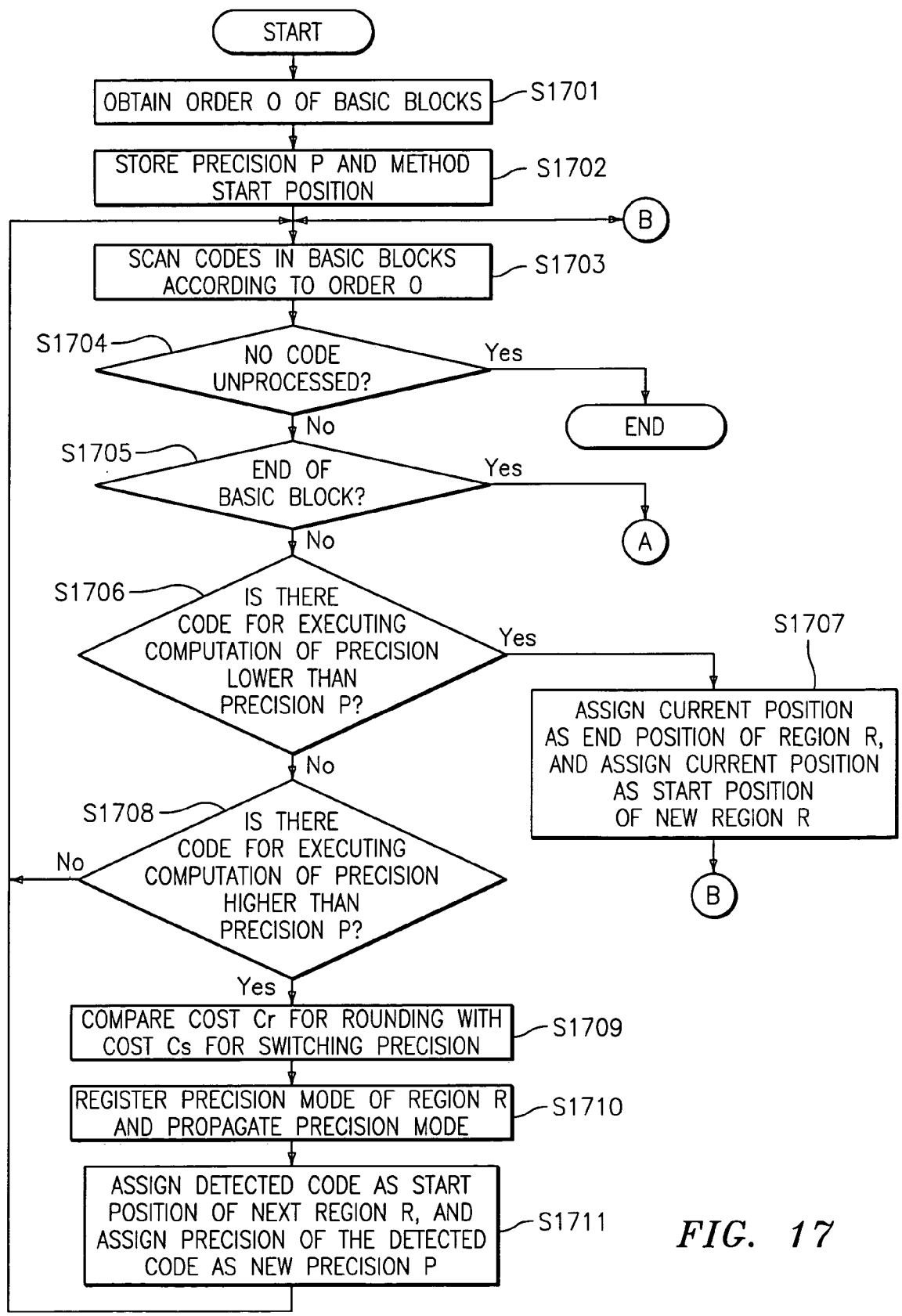
FIG. 17 is a continuation of the flow chart illustrating a process flow in which a precision region analysis unit retrieves the single precision regions and determines a precision mode in the floating-point computation with respect to a target method, in the fourth embodiment.
Figure 18:
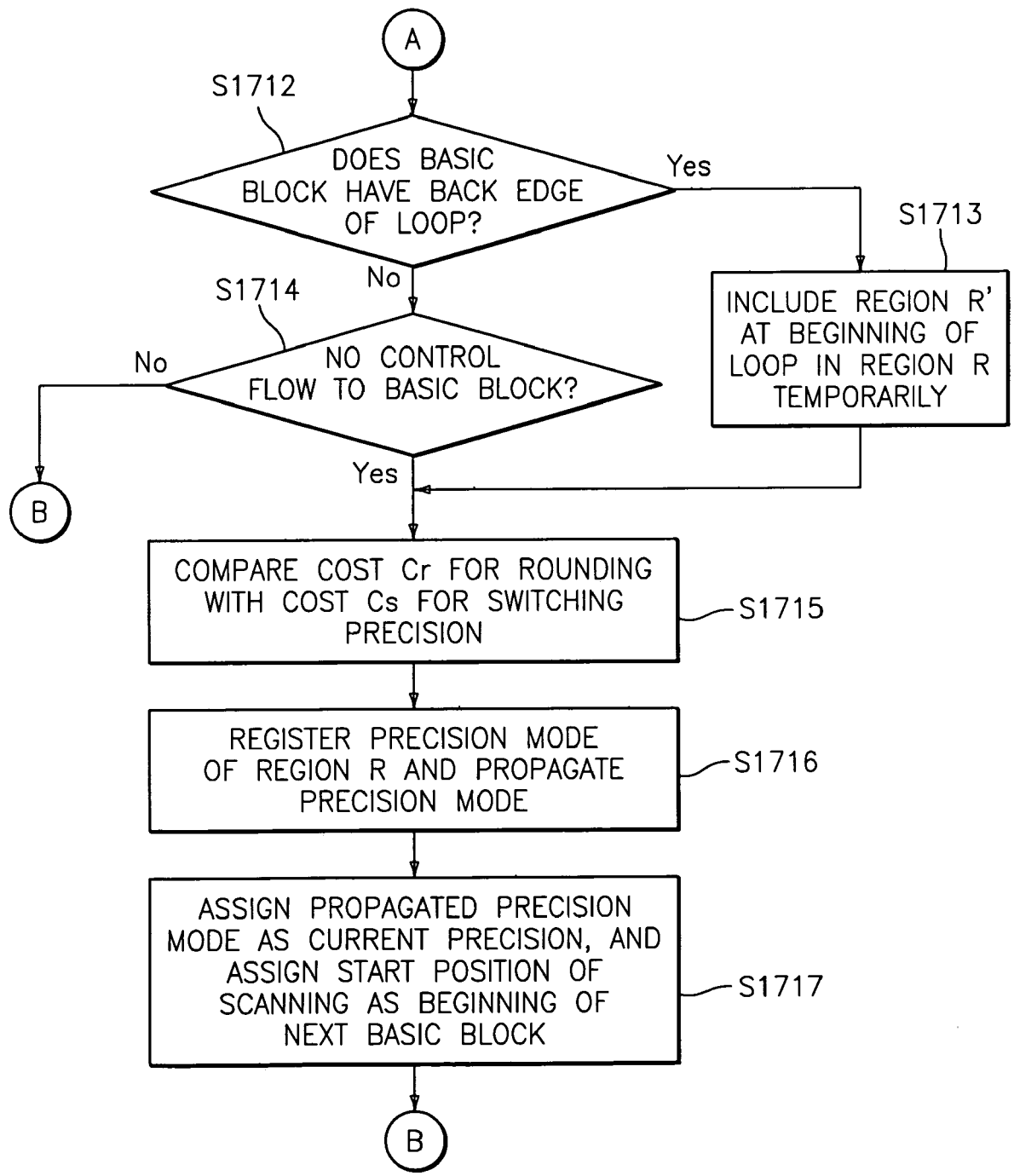
FIG. 18 is the flow chart illustrating the process flow in which the precision region analysis unit retrieves the single precision regions and determines the precision mode in the floating-point computation with respect to a target method, in the fourth embodiment.

FIGS. 17 and 18 are flowcharts illustrating a process in which the precision region analysis unit 130 retrieves the single precision regions and determines the precision mode for the floating-point computation with respect to a target method.

As shown in FIGS. 17 and 18, the precision region analysis unit 130 first takes input code (the binary code) of a method in which different precision computations are mixed, as a target method to be processed. Then, the precision region analysis unit 130 orders basic blocks on the control flow (a range of a code sequence in which the control flow does not enter or exit in the middle thereof) in depth first order considering an execution frequency, and assigns this order as the order O (step 1701). For example, considering a source code shown in FIG. 19(A), four basic blocks as shown in FIG. 19(B) are generated with respect to this source code, and they are in the order of Basic Block 1, Basic Block 2, Basic Block 4 and Basic Block 3 by ordering in the depth first order.

In addition, the beginning of the target method is assigned as the start position of the region (the single precision region or other region) R, and the precision of the target method when it is called (for example, the precision mode determined by running the program in the first embodiment, or the precision mode determined to optimize each method in the second embodiment) is assigned as the current precision P (the precision mode to be set for the region R) (step 1702). The region R and the precision P are managed, for example, by providing a management table (a data structure) as shown in FIG. 20 and registering them in the table. This management table 2001 is generated in the precision region analysis unit 130 in the compiler 100, and retained in the memory 300. As shown in FIG. 20, the management table 2001 is provided with items such as the number for identifying the region R, start position, end position, basic blocks included in the region, and attribute (the precision mode), which are registered for each of the regions.

Next, the precision region analysis unit 130 scans the codes in the basic blocks not yet processed according to the order O (steps 1703, 1704 and 1705).

Then, if the code (the lower precision code) for executing the calculation with the precision lower than the current precision P (the single precision if the current precision P is the double precision) is found, the precision region analysis unit 130 assigns the current position (prior to the lower precision code) as the end position of the region R. Then, the precision region analysis unit 130 assigns the current position (the lower precision code) as the start position of the new region R (steps 1706 and 1707), and returns to step 1703.

On the other hand, if the code (the higher precision code) for executing the calculation with the precision higher than the current precision P (the double precision if the current precision P is the single precision) is found, the precision region analysis unit 130 compares the cost Cs for switching the precision mode at the entry and the exit of the region R using Approach 1, against the cost Cr for rounding each of the calculations with the precision P included in the region R using Approach 2 (steps 1708 and 1709). Then, if the cost Cs is higher, the precision region analysis unit 130 registers in the management table 2001 such that this region R is executed in the high precision (the double precision) mode. If the cost Cr is higher, the precision region analysis unit 130 registers in the management table 2001 such that this region R is executed in the low precision (the single precision) mode. Then, the precision region analysis unit 130 propagates the determined precision mode to a destination of the control flow exiting from the end of the basic block in the region R (step 1710).

Subsequently, the precision region analysis unit 130 assigns the detected code as the start position of the next region R, assigns the precision of the higher precision code as the new current precision P (step 1711), and returns to step 1703.

When the precision region analysis unit 130 scanning the codes in the basic blocks reaches the end of the basic block (a last code), it examines whether the basic block has a back edge of a loop, that is, the control flow returning from the basic block to the beginning of the loop (step 1712 in FIG. 18).

If the basic block has the back edge of the loop, it is ensured by the order O that this beginning of the loop has been processed prior to the basic block currently being processed. A region R', which this beginning of the loop belongs to and which has been already processed, is included in the region R temporarily (step 1713). If the above described basic block does not have the back edge of the loop, next the precision region analysis unit 130 examines whether there is any control flow from the end of the basic block to another basic block (step 1714).

In the example shown in FIG. 19, when the codes are scanned in the depth first order as Basic Block 1, Basic Block 2, Basic Block 4 and Basic Block 3, there is no control flow at the end from Basic Block 4 going to Basic Block 3, and there is control flow at the end of other basic blocks.

If there is control flow to another basic block, the precision region analysis unit 130 returns to step 1703, moves to the destination basic block of the control flow, and continues scanning the codes.

On the other hand, if there is no control flow to another basic block or the basic block has the back edge of the loop, the precision-region analysis unit 130 then compares the cost Cs related to switching the precision mode at the entry and the exit of the region R using Approach 1, with the cost Cr related to rounding each of the computations of the precision P included in the region R using Approach 2 (step 1715). Then, if the cost Cs is higher, the precision region analysis unit 130 registers in the management table 2001 such that the region R is executed in the high precision (the double precision) mode. If the cost Cr is higher, the precision region analysis unit 130 registers in the management table 2001 such that the region R is executed in the low precision (the single precision) mode. Then, the precision region analysis unit 130 propagates the determined precision mode to the destination of the control flow exiting from the end of the basic block in the region R (step 1716).

Subsequently, the precision region analysis unit 130 assigns the propagated precision mode as the current precision, assigns a start position of the scanning as the beginning of the next basic block (step 1717), and returns to step 1703.

The precision region analysis unit 130 repeats the above described process with respect to all of the codes in the target method to be compiled, and if there is no code unprocessed, completes the process (step 1704 in FIG. 17).

The code generation unit 120 refers to the management table 2001 which is generated by the precision region analysis unit 130 and retained in the memory 300, and generates the machine language code, selecting the precision mode for each of the regions R. As a result, the regions R for which the single precision mode is selected are the single precision regions, and the double precision mode is selected for other regions.

As described above, in this embodiment, with respect to the target method in which the single precision computations and the double precision computations are mixed, code analysis is performed to divide the codes in the target method into the single precision regions and other regions, separating the code regions that require the double precision mode, and then the code generation is executed in the appropriate base precision mode for each of the regions. Therefore, for example, the number of the target methods is increased for which the specialized code for the single precision mode is generated if this embodiment is used with the first embodiment by separating the code regions for executing the double precision computations and making the single precision regions be handled in the single precision mode. In addition, it may be possible to execute the code generation in an appropriate precision mode for each portion of the program in a finer granularity than the method level if this embodiment is used with the second embodiment.

The above four embodiments are described with respect to the case where the double precision mode and the single precision mode are used as the floating-point computation precision. However, there is the case where an extended precision mode is used as the floating-point computation precision mode. In this case, the respective embodiments can be applied to this extended precision mode as well. For example, in the first embodiment, with respect to the predetermined default precision mode (for example, the double precision mode), it is possible to generate the machine language code specialized for the extended precision mode based on the execution result (the execution profile) collected by running the program. In addition, in the second embodiment, on the condition that the call site is statically bound, the code is generated in the extended precision mode if necessary so as to optimize the target method to be compiled. Furthermore, in the fourth embodiment, it is possible to execute the appropriate code generation by separating the code regions in which the extended precision mode is continuous, using the code analysis with respect to the target method.

The invention claimed is:

1. A method of optimizing machine language code generated from source code having both single and double precision computation, said machine language code used to create an executable program, the optimizing machine language code comprising the steps of:
   a) storing a count of times one or more precision computations are called in a double or single precision mode in a floating-point computation;
   b) selecting a default precision mode to be either the double precision mode or the single precision mode and examining a frequency with which a target precision computation is called in a non-default precision mode, based on said stored count; and
   c) generating and storing generalized code corresponding to a call in a non-default precision mode with respect to the target precision computation, based on said frequency with which a target precision computation is called.

2. The method of claim 1, wherein step (a) further comprising a step of:
   counting the number of times said precision computations are called in the non-default precision mode during runtime of said program.

3. The method of claim 1, wherein step (b) further includes a step of comparing said count with a preset threshold and step (c) further includes a step of generating said generalized code when said count exceeds said threshold.

4. The method of claim 1, wherein step (c) further comprising the steps of:
   determining prior to generating said generalized code, whether a processing cost may be reduced if said target precision computation is operated in the non-default precision mode.

5. The method of claim 1, wherein prior to generating and storing said generalized code, step (c) further comprises the steps of:
   detecting any target precision computations in which the computation is executed in an excessive precision; and
   replacing said detected target precision computations with single precision computations.

6. The method of claim 1, wherein step (c) further comprises a step of performing code analysis with respect to the target precision computations to be compiled;
   dividing the target precision computations into regions for executing single precision computations and regions for executing double precision computations, said regions being determined by results of the code analysis.

7. A method for generating a machine language code by controlling a computer to compile a program, the method comprising the steps of: a) setting a computation precision for calling a target computation, said computation precision being based on a precision mode in a floating-point computation of a caller computation and generating and storing a machine language code; b) determining the precision mode of said target computation and said caller computation, said precision mode being a double or single precision mode; and c) generating an auxiliary code depending on a relation between the precision mode in said target computation and the precision mode in said caller computation and adding the auxiliary code to the stored machine language code, if the precision mode in said caller computation is different from the precision mode in said target computation.

8. The method of claim 7, wherein step (a) further comprises the steps of:
   detecting said target computation which is executed in an excessive precision; and
   replacing said precision mode of said target computation with a single precision mode.

9. The method of claim 7, wherein step (a) further comprises the steps of:
   performing code analysis of said target computation;
   dividing said target computation into regions for executing single precision computations and regions for executing double precision computations in accordance with results of said analysis; and
   setting said computation precision for each of said regions to generate the machine language code.

10. An apparatus for optimizing machine language code generated from source code having both single and double precision computations, said machine language code used to create an executable program, the apparatus comprising:
   a compiler for compiling the source code according to a precision computation; and
   a program execution unit for executing the source code in an interpreter and said program compiled by said compiler,
   wherein said compiler
      generates a first code of a target computation in a default precision mode selected from at least one of a double precision mode and a single precision mode in a floating-point computation, and
      generates a second code of said target computation in a non-default precision mode selected from at least one of the double precision mode and the single precision mode if said target computation satisfies a predefined condition.

11. The apparatus of claim 10, wherein if said target computation operating in said non-default precision mode calls another computation operating in said non-default precision mode, said program execution unit calls said second code generated in said compiler.

12. The apparatus of claim 11, wherein if a target computation to be compiled may reduce processing costs by using said second code rather than said first code and if a frequency in which said another computation is called from the target computation in said non-default precision mode is high, said compiler generates said second code.

13. The apparatus of claim 10, wherein said compiler further comprises:

an excessive-precision optimization unit for detecting in a target computation a portion to be compiled in which a computation is executed in an excessive precision and replacing the computation of the portion with a single precision computation; and a code generation unit for generating said first code and said second code to reflect a process result from said excessive-precision optimization unit.

14. The apparatus of claim 10, wherein said compiler further comprises:

a precision region analysis unit for performing code analysis with respect to a target computation to be compiled and for dividing the target computation into regions for executing single precision computations and regions for executing double precision computations; and a code generation unit for setting a computation precision for each of said regions to generate machine language code based on an analysis result from said precision region analysis unit.

15. A data processing apparatus for generating a machine language code by compiling a program, said apparatus comprising:

a code generation means for setting a computation precision, with respect to a target computation to be compiled, depending on a precision mode in a floating-point computation in a caller computation for calling said target computation, and generating a machine language code; and auxiliary code addition means for generating an auxiliary code, based on a relation between the precision mode in said target computation and the precision mode in said caller computation, for matching said precision mode, and adding the auxiliary code to the machine language code generated in said code generation means.

16. The apparatus of claim 15, wherein said auxiliary code addition means adds the code for matching the precision mode of the target computation with respect to said caller computation if the precision mode in said target computation is different from the precision mode in said caller computation.

17. The apparatus of claim 15, further comprising excessive precision optimization means for detecting a portion in the target computation to be compiled in which the computation is executed in an excessive precision, and replacing the portion with a single precision computation, wherein said code generation means generates machine language code to reflect a process result from said code addition means.

18. The apparatus of claim 15, further comprising precision region analysis means for executing a code analysis with respect to the target computation to be compiled and dividing the target computation into regions for executing single precision computations and regions for executing double precision computations, wherein said code generation means sets the computation precision for each of said regions to generate the machine language code, based on an analysis result from said precision region analysis means.

19. A computer program device readable by a machine, tangibly embodying a program of instructions executable by the machine to perform computation steps for a program for generating a machine language code by controlling a computer to compile an executable program, said program causing said computer to perform the steps of:

a) storing information regarding whether a computation is called in a double precision mode or a single precision mode in a floating-point computation when said executable program is executed; b) when a target computation is compiled, examining a frequency with which said target computation is called in a non-default precision mode, based on the stored information, if a default precision mode is selected from at least one of the double precision mode and the single precision mode in the floating-point computation in said executable program; and c) generating and storing a specialized machine language code corresponding to the call in said non-default precision mode with respect to said target computation based on obtained information on the frequency in which the target computation is called in said non-default precision mode.

20. The program of claim 19, wherein step (c) further comprises a step of generating said specialized machine language code with respect to said target computation to be compiled if processing costs are reduced when said target computation is operated in said non-default precision mode.

21. The program of claim 19, wherein step (c) further comprises the steps of:

detecting a portion in said target computation to be compiled, in which the computation is executed in an excessive precision; and replacing the portion with a single precision computation.

22. The program of claim 19, wherein step (c) further comprising the steps of:

performing code analysis with respect to said target computation to be compiled; and dividing the target computation into regions for executing single precision computations and regions for executing double precision computations based on results of the code analysis.

23. A computer program device readable by a machine, tangibly embodying a program of instructions executable by the machine to perform computation steps for a program for generating a machine language code by controlling a computer to compile an executable program, said program causing said computer to perform the steps of:

a) setting a computation precision, with respect to a target computation to be compiled, depending on a precision mode in a floating-point computation in a caller computation for calling said target computation and generating and storing a machine language code; b) examining a relation between said target computation and said caller computation; and c) generating an auxiliary code depending on the relation and adding the auxiliary code to the stored machine language code.

24. The program of claim 23, wherein step (c) further comprises the step of adding code for matching the precision mode of the target computation with respect to the caller computation if the precision mode in said target computation is different from the precision mode in said caller computation.

25. The program of claim 23, further comprising the steps of:

detecting a portion to be compiled in said target computation, in which the computation is executed in an excessive precision; and replacing the detected portion with a single precision computation.

26. The program of claim 23, further comprising the steps of:

performing code analysis with respect to said target computation to be compiled;

dividing the target computation into regions for executing single precision computations and regions for executing double precision computations based on the results of the code analysis; and setting the computation precision for each of said regions to generate the machine language code.

* * * * *